United States Patent [19]

Inushima et al.

[11] Patent Number: 5,670,777

[45] Date of Patent: Sep. 23, 1997

[54] PHOTOSENSITIVE DEVICE AND TWO FREQUENCY DRIVING METHOD THEREOF

[75] Inventors: Takashi Inushima, Kanagawa, Japan; Rimantas Vaitkus, Vilnius, Lithuania; Satoshi Teramoto, Kanagawa, Japan

[73] Assignee: Semiconductor Energy Laboratory Co., Ltd., Kanagawa-ken, Japan

[21] Appl. No.: 422,544

[22] Filed: Apr. 12, 1995

[30] Foreign Application Priority Data

Apr. 14, 1994 [JP] Japan .................................. 6-100674

[51] Int. Cl.$^6$ ........................................ H01L 21/00
[52] U.S. Cl. ................ 250/214.1; 257/77; 250/338.4
[58] Field of Search ............................ 250/214.1, 214 R, 250/338.1, 338.4, 339.01, 339.05, 339.11, 370.01, 370.08, 370.09; 257/76, 77, 431, 451

[56] References Cited

U.S. PATENT DOCUMENTS

| | | | |
|---|---|---|---|
| 3,805,124 | 4/1974 | Nagasawa et al. | 257/76 |
| 5,162,886 | 11/1992 | Nishibayashi et al. | 257/421 |
| 5,406,081 | 4/1995 | Inushima | 250/338.4 |
| 5,420,443 | 5/1995 | Dreifus et al. | 257/77 |
| 5,469,424 | 11/1995 | Inushima et al. | 369/120 |

*Primary Examiner*—Edward P. Westin
*Assistant Examiner*—John R. Lee
*Attorney, Agent, or Firm*—Sixbey Friedman Leedom & Ferguson; Gerald J. Ferguson, Jr.; Thomas W. Cole

[57] ABSTRACT

An electronic device utilizing a material having: a photoconductive effect; a trap level for trapping an excited carrier; and an energy band gap, the device comprising: a means for illuminating the material with a first light, the first light having a wavelength corresponding to an energy higher than the energy band gap of the material; a means for illuminating the material with a second light, the second light having a wavelength corresponding to an energy lower than the energy band gap of the material; a means for measuring the quantity of second light transmitted through the material; and a means for obtaining information on the first light illuminated to the material from the quantity of the transmitted second light.

40 Claims, 10 Drawing Sheets

○ OPTICAL TRANSMISSION
▲ UV ILLUMINATED SAMPLE (15 μW/cm$^2$)
● WITHOUT UV ILLUMINATION

○ RADIANT INTENSITY 7 μW/cm -2
▲ RADIANT INTENSITY 15 μW/cm -2
· RADIANT INTENSITY 34 μW/cm -2

PHOTOSENSITIVE DEVICE AND TWO FREQUENCY DRIVING METHOD THEREOF

BACKGROUND OF THE INVENTION

The present invention relates to an electronic device having at least one of the following functions:

a function of detecting light;

a function of measuring the quantity of light:

a function of optically writing information and optically reading out information; and an arithmetic function which inputs and outputs light.

Various types of optical sensors, for instance, a type utilizing the optical sensitivity of a semiconductor, a type using a light-sensitive substance, and a type utilizing photoelectric effect, are conventionally known.

Widely known devices for detecting light include those utilizing photovoltaic effect which converts photo energy into an electric energy, and those taking advantage of the photoconductive effect in which the conductivity of a semiconductor changes with the irradiation of light. Devices of the former type include a photoelectric conversion device comprising a PN junction or a PIN junction of a silicon semiconductor, and those of the latter type include photodiodes and phototransistors.

Also known is a device which measures the dose of a light or a radiation irradiated thereto by the light-emitting phenomenon of the material.

Furthermore, there are electronic devices generally known as optical discs, i.e., devices having a memory function in which writing and reading out are effected by using light.

DETAILED DESCRIPTION OF THE INVENTION

FIG. 1 shows a graph obtained by measuring the photosensitivity of a thin-film diamond placed between a pair of electrodes while applying a voltage between the pair of electrodes. More specifically, a pair of gold electrodes were provided to a 1 mm$^2$ area square thin-film of polycrystalline diamond (15 μm in thickness) fabricated by a microwave CVD (chemical vapor deposition) process under a magnetic field, and a voltage was applied to the pair of the electrodes to measure the change in photosensitivity while varying the applied voltage.

Referring to FIG. 1, the graph shows a relation between the photo energy applied to the thin-film diamond and the photosensitivity shown in a logarithmic scale, as well as a relation between the photo energy and the transmission of the thin-film diamond. In the figure, the abscissa represents the photo energy expressed by the corresponding wavelength of light. In short, the abscissa of the graph in FIG. 1 represents the wavelength of light converted to the units of electron volt (eV) (i.e., the so-called photo energy or photon energy, corresponding to the energy of photons hv expressed in units of eV). A wavelength λ (nm) referred in the present specification is converted to the energy E (λ) in units of electron volts (eV) according to an approximation equation of $\lambda \times E(\lambda) = 1,240$.

In FIG. 1, the plots given with open circles show the change in transmission of the thin-film diamond with varying wavelength of irradiated light, and are read by the scale given on the right side. The plots given with filled triangles illustrate the photosensitivity of a thin-film diamond while irradiating thereto a light varied in wavelength corresponding to the values given in the abscissa and irradiating simultaneously a light emitted from a deuterium lamp at a wavelength in a range of from 180 to 350 nm (corresponding to an energy of from about 6.9 eV to about 3.3 eV) and at an intensity of 15 μW/cm$^2$. The plots given with filled circles illustrate the change in photosensitivity while irradiating a light varied in wavelength corresponding to the values given in the abscissa, but without irradiating a light from a deuterium lamp.

Referring to the transmission shown by open circle spots, the graph clearly shows that the transmission abruptly drops as the photo energy exceeds about 5.5 eV. It can be read therefrom that the energy band gap of the thin-film diamond is approximately 5.5 eV (which corresponds to a wavelength of about 230 nm or shorter). Referring to the plots given with filled circles, it can be seen that the photosensitivity increases with increasing energy of the irradiated light, i.e., with decreasing wavelength of the irradiated light.

Referring to the values plotted with filled triangles, it can be seen that the photosensitivity becomes constant in the case where a light is irradiated at a wavelength in an energy region of about 2.8 eV or higher (corresponding to a region of about 440 nm in wavelength or more). Furthermore, with increasing irradiated energy from a value in the vicinity of about 5 eV (corresponding to a wavelength of about 250 nm), the photosensitivity values fall in approximately the same values plotted by filled circles corresponding to the case in which no ultraviolet radiation is irradiated by using a deuterium lamp. On comparing the observed values plotted with filled triangles, i.e., the values corresponding to the case in which photosensitivity is measured while irradiating an ultraviolet radiation using a deuterium lamp, with those plotted with filled circles, i.e., the values for the case in which photosensitivity is measured without irradiating an ultraviolet radiation using a deuterium lamp, it can be seen that, in an energy region of about 5 eV or higher, the both plots agree fairly well with each other to provide curves with approximately the same loci. However, the loci of the two curves greatly differ from each other in an energy region of about 5 eV or lower.

The energy value of about 5 eV is in good agreement with the energy band gap of diamond, which is about 5.5 eV. That is, the observed value and the energy band gap can be safely said that they agree with each other.

Referring to FIG. 1, it can be read from the graph that the photosensitivity is greatly influenced for a light with an energy value of about 5 eV or lower (corresponding to a wavelength of about 250 nm or higher) in the case where an ultraviolet radiation is irradiated by using a deuterium lamp. It can be understood therefrom that the photosensitivity obtained with a light having an energy of about 5 eV or lower includes information related to the light having an energy of 5 eV or higher among the ultraviolet radiation emitted from the deuterium lamp.

It can be seen from the foregoing that in the case where an ultraviolet radiation having a wavelength shorter than the wavelength approximately corresponding to the energy band gap of diamond is irradiated, the information thereof can be read out from the observed photosensitivity obtained by irradiating a light having a wavelength longer than the wavelength corresponding approximately to the energy band gap of diamond.

In FIG. 2 is shown the relation between the time duration of irradiating an ultraviolet radiation (UV irradiation time) emitted from a deuterium lamp having a wavelength of from 180 to 350 nm and the photocurrent for a polycrystalline thin-film diamond. That is, FIG. 2 shows the time dependence of a photocurrent of a polycrystalline thin-film diamond with respect to an ultraviolet radiation in a wavelength range of from 180 to 350 nm. The photocurrent in the case above is obtained by measuring the current flow in the thin-film diamond on applying a constant voltage between a pair of electrodes while irradiating a light emitted from the deuterium lamp above to the aforementioned thin-film diamond. Three curves are given in FIG. 2. The curve plotted with open circles corresponds to a case in which the ultraviolet radiation is irradiated at an intensity of 34 µW/cm$^2$, the curve plotted with filled triangles is for a case in which the ultraviolet radiation is irradiated at an intensity of 15 µW/cm$^2$, and filled circles extrapolated with a curve represent the data obtained from the case where an ultraviolet radiation is irradiated at an intensity of 7 µW/cm$^2$.

The right end of the data shown with filled circles exhibits that the photocurrent is obtained in pulses. The pulsed photocurrent is obtained by irradiating white light at a wavelength of from 360 to 800 nm to the thin-film diamond upon completion of irradiating the light from the deuterium lamp.

It can be seen from FIG. 2 that photocurrent saturates at different values depending on the intensity of the light irradiated from the deuterium lamp. The relation between the saturation value of the photocurrent and the intensity of the irradiated light is studied, and the data are given in FIG. 3. FIG. 3 is a graph showing the relation between the intensity of an ultraviolet light irradiated from a deuterium lamp (i.e., radiant intensity, expressed in logarithmic scale in the abscissa) and the ratio of the current obtained without irradiating a light using a deuterium lamp and the current saturated by irradiating a light using a deuterium lamp (photocurrent) (i.e., a ratio of the photocurrent under illuminated condition and the dark photocurrent, expressed in logarithmic scale in the ordinate). In short, the graph in FIG. 3 shows the relation between the radiant intensity and the illuminated photocurrent to dark photocurrent ratio upon irradiating an ultraviolet radiation to a thin-film diamond.

According to FIG. 3, it can be seen that a linear relationship is clearly established over a range of three digits in the relation between the intensity of the ultraviolet radiation and the saturated photocurrent.

Furthermore, data showing the relation between the radiant intensity of ultraviolet radiation irradiated from the deuterium lamp (abscissa) and the time necessary for the saturation of photocurrent (ordinate) are given in FIG. 4. In the graph of FIG. 4, the ordinate gives the time necessary for a photocurrent to achieve a 90% saturation.

Referring to FIG. 4, it can be seen that a long time is necessary for the photocurrent to attain a saturated value in the case where the ultraviolet radiant intensity is low. However, when an ultraviolet radiation is irradiated at a high intensity, a saturated state can be rapidly achieved.

The change in photocurrent (the state showing pulsed flow of photocurrent) upon irradiating a white light to a thin-film diamond sufficiently illuminated previously with an ultraviolet radiation emitted from a deuterium lamp at an irradiation intensity of 7 µW/cm$^2$ is shown on the right side of the graph of FIG. 2. The relation between the dose (µWs/cm$^2$) of the ultraviolet radiation emitted from the deuterium lamp and the maximum value (expressed by arbitrary unit) of the pulsed photocurrent obtained by irradiating white light to the thin-film diamond illuminated with an ultraviolet radiation is shown by data plotted and indicated by (1) in the graph of FIG. 5. The data indicated by (1) are read with the scale provided on the left side. The data indicated by (2) show the relation between the dose of the ultraviolet radiation emitted from a deuterium lamp and the total photocurrent (in arbitrary unit) obtained by irradiating the thin-film diamond with white light for a duration of 5 minutes. The latter data are read with the scale given on the right side.

The dose is defined by the product of radiant intensity and the duration of irradiation, or by the integrated value thereof. The dose is expressed by a unit of µWs/cm$^2$. The total photocurrent represents the total value of the photocurrent generated by irradiating white light as shown in FIG. 2, obtained by integration for a duration of 5 minutes. Referring to FIG. 2, more specifically, the total photocurrent corresponds to the area defined by the curve, i.e., the time-integrated value. In FIG. 5, the value of total photocurrent is given in arbitrary unit.

Referring to data indicated by (1) in FIG. 5, the dose of the ultraviolet radiation on thin-film diamond is proportional to the maximum value of photocurrent obtained by irradiating the white light to the thin-film diamond illuminated previously with an ultraviolet radiation. Furthermore, considering that the data plotted with filled circles, filled triangles, and open circles corresponding to different radiant intensities fall approximately on a same straight line, it can be seen that the maximum photocurrent induced by the irradiation of a white light accurately reflects the dose thereof, and not the radiant intensity of the ultraviolet radiation.

Concerning the data indicated by (2), the total photocurrent flown during the irradiation of white light for a duration of 5 minutes after irradiating an ultraviolet radiation changes proportional to the dose of the ultraviolet radiation irradiated to the thin-film diamond. It can be seen therefrom that the dose of the ultraviolet radiation can be read from the total photocurrent induced by the irradiation of a white light.

It can be therefore concluded from the discussion above that the dose of the ultraviolet radiation irradiated from a deuterium lamp to a polycrystalline thin-film diamond can be determined by irradiating white light to the polycrystalline thin-film diamond and measuring the maximum photocurrent or the total photocurrent induced within a predetermined duration of time. More specifically, the dose of the ultraviolet radiation irradiated to a polycrystalline thin-film diamond can be read out by using white light as a read-out light.

Furthermore, the maximum value of the photocurrent induced by the white light can be interpreted as a total photocurrent for a minute duration time (i.e., an integrated value of photocurrent for a minute duration time). Thus, by defining the minute duration of time as a predetermined duration of time, it can be readily understood that the measurement of a maximum photocurrent is substantially the same as the measurement of the total photocurrent within a predetermined duration of time.

When white light is irradiated after irradiating the ultraviolet radiation as shown on the right side of FIG. 2, the maximum value of the photocurrent which generates in pulses gradually decreases with progressive irradiation of white light. It can be understood therefrom that the information on the irradiated ultraviolet radiation is read out and erased by the irradiation of white light.

FIG. 2 illustrates a case in which white light from 360 to 800 nm in wavelength is used as the read-out light. Data similar to those given in FIG. 5 can be obtained by using a monochromatic light as the read-out light. FIG. 6 illustrates a case in which a monochromatic light is used as the read-out light. Referring to FIG. 6, the abscissa represents wavelength converted into energy expressed in units of electron volt (eV), and the ordinate represents the time necessary for a photocurrent to drop from its maximum value to 90% of the maximum value, i.e., the time duration for achieving 10% reduction of photocurrent, upon irradiating a read-out light corresponding to the wavelength given in the abscissa. A monochromatic light was obtained by means of a spectroscope.

Referring to FIG. 6, it can be seen that the photocurrent decreases over a longer duration of time with reducing energy of read-out light for reading out the dose of the ultraviolet radiation and with increasing wavelength of the read-out light. Furthermore, it can be understood from the figure that the photocurrent decreases rapidly in the case where a light having a higher energy is used for the reading out. Conclusively, longer duration of time is necessary for reading out the dose of the ultraviolet radiation with decreasing energy of the read-out light. On the contrary, it is possible To shorten the read-out time by increasing the energy of light.

Although depending on the wavelength, the photocurrent gradually decreases as shown on the right side of FIG. 2 if light is irradiated continuously for the read-out. If a read-out light (i.e., a white light in a wavelength region of from 360 to 800 nm in this case) is once irradiated sufficiently to fully reduce the photocurrent, no pulsed photocurrent generates again even if the irradiation of read-out light is stopped and re-initiated. This fact signifies that the information related to the dose of the irradiated ultraviolet radiation is lost once a read-out light is irradiated at a sufficiently high dose. FIG. 2 shows a case in which white light is used as the read-out light. From FIG. 2, it can be understood that the information is read out in a short period of time. However, a piece of information written by using an ultraviolet radiation can be erased by taking advantage of this phenomena.

When using a pulsed light having short duration of irradiation time, on the other hand, a linear relationship between the dose of the ultraviolet radiation and the maximum photocurrent upon irradiating a read-out light can be obtained as shown in FIG. 5. In this case, a maximum photocurrent almost accurately reflecting the dose of the ultraviolet radiation can be obtained whenever the read-out light is irradiated as a pulsed light. Accordingly, the dose of the ultraviolet radiation can be read out for a plurality of times. As a matter of course, and although differing in the degree of diminution, the maximum photocurrent corresponding to the irradiation of a read-out light gradually decreases with increasing repetition time of reading out.

The maximum times of repeating the reading out of the information using a pulsed light can be presumed by the data given in FIG. 6. In case of using a read-out light about 520 nm in wavelength, i.e., a light with a wavelength corresponding to an energy of 2.4 ev, for instance, the dose of the ultraviolet radiation can be determined for a read-out of $10^3$ times or more by assuming that the time duration of irradiation necessary for once reading out a piece of information is on the order of millisecond. To know simply whether an ultraviolet irradiation had been irradiated or not, moreover, reading out can be repeated for $10^4$ times or more. If a pulsed light with a shorter wavelength is used for the reading out, as a matter of course, the maximum repetition times for reading out the accurate dose of the ultraviolet radiation decreases in a manner shown in FIG. 6 (by taking the repetition times in the ordinate and energy values corresponding to the wavelength of the pulsed light in the abscissa).

Furthermore, even when pulsed light is used as the read-out light, the times for accurately measuring the dose of the ultraviolet radiation decrease if the intensity of irradiation increases. On the contrary, the repetition of reading out can be increased by decreasing the intensity of read-out light.

The basic data shown in FIGS. 1 to 6 are obtained by using a deuterium lamp as a light source for emitting an ultraviolet radiation in a wavelength of from 180 to 350 nm. Accordingly, the data above assumably are, at the same time with writing information on the dose in the thin-film diamond, read out by a light having a wavelength of 230 nm or longer; that is, a light having an energy lower than the energy band gap of diamond. However, the deuterium lamp used in the experimentation yields an intensity spectrum stronger in the short wavelength side and decreasing in the long wavelength side, the influence of light having an energy lower than the energy band gap of diamond, i.e., the influence of light in a wavelength region of about 230 nm or more, is assumed negligible.

To confirm the assumption above, a light emitted from a mercury vapor lamp having an intensity distribution with a strong peak in the wavelength region of 230 nm or longer was irradiated simultaneously with the light emitted from a deuterium lamp. Photocurrent induced by irradiating white light was measured thereafter. A large photocurrent could not be obtained as a result, and the relation as shown in FIG. 5 was not obtained between the photocurrent and the dose of light emitted from the deuterium lamp and the mercury vapor lamp. It was found therefore that a radiation having a wavelength of 230 nm or longer greatly affects the radiation of light having a wavelength in the region of about 230 nm or shorter. Furthermore, it can be concluded that the information concerning the dose of a light having a wavelength of about 230 nm or shorter is not written accurately into the thin-film diamond. It is also confirmed that the light emitted from a deuterium lamp in a wavelength region of about 230 nm or longer has little effect on writing the information.

Furthermore, light emitted from mercury vapor lamp only was irradiated to the thin-film diamond while excluding the ultraviolet radiation emitted from deuterium lamp. On measuring the photocurrent attributed to the irradiation of a white light thereafter, significant data as illustrated in FIGS. 2 and 5 were not obtained. This is assumably due to the fact that the light emitted from a mercury vapor lamp fall in a wavelength region corresponding to an energy region of about 5.5 eV, i.e., an energy region not higher than the energy band gap of diamond. Also in the case of irradiating white light simultaneously with the light emitted from a mercury vapor lamp, no particularly significant data were obtained.

The above discussion is summarized below.

Firstly, information related to an ultraviolet radiation (and particularly, the dose thereof) irradiated to a diamond and having a wavelength corresponding to an energy higher than the energy band gap of the diamond can be obtained from a photocurrent induced by a read-out light having a wavelength longer than that corresponding to the energy band gap of the diamond. That is, the information related to an ultraviolet radiation irradiated to diamond and having a wavelength shorter than about 230 nm can be read out by irradiating a read-out light having a wavelength of about 230 nm or longer to the diamond. Particularly, the dose of the ultraviolet radiation can be measured with high precision.

Secondly, information can be read out repeatedly for a plurality of times by using a pulsed light for the read-out light.

Thirdly, the times of repeatedly reading out the information can be increased by using a light with longer wavelength as the read-out light.

Fourthly, the times of repeatedly reading out the information can be increased by using a light with a weaker intensity as the read-out light.

Fifthly, the information related to the dose of incident ultraviolet radiation can be erased by reading out information over a long period of time, and by using white light as the read-out light, or by increasing the dose of the read-out light.

In the foregoing, the term "information related to an ultraviolet radiation" as referred in the first summary signifies at least one piece of information selected from the dose, whether an ultraviolet radiation was irradiated or not, and the difference in wavelength (which is described hereinafter).

The operation model for how information concerning the dose of the ultraviolet radiation irradiated to a diamond is stored is discussed below.

Referring to FIG. 1, it can be seen that information related to an ultraviolet radiation irradiated to a diamond and having an energy higher than about 5 eV (specifically, the information on whether such a radiation is irradiated or not) can be obtained by irradiating a light having an energy lower than about 5 eV and measuring the photocurrent (photosensitivity in case of FIG. 1) induced thereby. In an energy region of about 5 eV or lower, FIG. 1 also reads that the photosensitivity values plotted by filled circles differ from those plotted by filled triangles, and that the difference is observed over the entire energy region not higher than 5 eV. Thus, assumably, the information related to the ultraviolet radiation irradiated to a thin-film diamond is distributed over the entire energy band gap of diamond ranging for about 5.5 eV.

Based on a model below, discussion is made on the experimental data obtained and shown in FIGS. 1 to 6.

(a) A considerable amount of impurities and lattice defects are present in a polycrystalline diamond. These impurities and defects form a trap level over the entire region of energy band gap.

(b) By irradiating an ultraviolet radiation capable of photo-exciting electron-hole pairs in crystalline diamond, the photo-excited carriers (electrons or holes) generated inside the diamond are captured by the trap level to provide a state corresponding to the information related to the dose of the ultraviolet radiation.

(c) When a light having an energy necessary for exciting the carriers in the trap level, i.e., a light having an energy lower than that corresponding to the energy band gap of diamond, is irradiated as a read-out light, the carriers trapped by the trap level are excited. The excited carriers lower the electrical resistance of the diamond, and hence, a photocurrent generates corresponding to the bias voltage applied to the diamond. The dose of the ultraviolet radiation can be measured from the photocurrent. According to the model, the total photocurrent which is induced by the irradiation of white light as indicated by (2) in FIG. 5 can be understood as being proportional to the number of carriers excited from the trap level.

Referring to FIG. 2, the information related to the dose of the ultraviolet radiation can be read out and erased by irradiating white light. This can be interpreted as a state in which the carriers trapped by the trap level are completely excited to contribute as carriers to the photocurrent.

According to the model described above, the reason why the dose of light emitted from a mercury vapor lamp is not read from the photocurrent induced by the irradiation of white light can be explained as follows.

The intensity spectrum of the radiation emitted from a mercury vapor lamp is mostly shifted to the wavelength region not lower than about 230 nm. Accordingly, electron-hole pairs, i.e., carriers, are generated by a small quantity of light (a first light) having a wavelength corresponding to an energy higher than the energy band gap of diamond, and are trapped by the trap level in correspondence with the dose of the first light. However, the carriers trapped by the trap levels are excited at the same time they are trapped by the trap levels, because light having a wavelength of about 230 nm or longer are irradiated simultaneously with the first light. In other words, the carriers trapped by the trap level become very few. Accordingly, it is found practically unfeasible to obtain the information on the dose of light emitted from a mercury vapor lamp from the photocurrent induced by the irradiation of white light.

At any rate, the photocurrent attributed to the number of carriers trapped by the trap level becomes extremely weak, and hence, it fails to accurately reflect the dose of light irradiated from a mercury vapor lamp.

Furthermore, significant data are found unobtainable by measuring photocurrent in the case where white light is irradiated at the same time with the radiation from a mercury vapor lamp. The reason for this can be explained by considering a state in which very few carriers are trapped by the trap level.

The experimental data shown in FIGS. 1 to 6 are studied further, and are summarized below.

With progressive irradiation of an ultraviolet radiation, the trap levels become filled with the carriers as to finally attain a saturated state. In other words, the number of carriers that are captured by the trap levels gradually increases until a certain upper limit is achieved.

The photocurrent generated by irradiating a read-out light is closely related with the number of carriers trapped by the trap level.

The rate of filling the trap levels is believed to depend on the total energy of the ultraviolet radiation (in the case where the ultraviolet radiation is irradiated at a constant wavelength, the total energy depends on the dose).

The number of carriers trapped by the trap level depends on the total energy of the ultraviolet radiation irradiated to the diamond.

The photocurrent generated by irradiating white light assumably depends on the number of carriers trapped by the trap level. That is, the integrated value for the photocurrent induced by irradiating white light assumably reflects the total energy of the ultraviolet radiation irradiated to the diamond.

The discussion above can be further extended to a conclusion as follows.

The energy of an ultraviolet radiation can be defined by the radiant intensity and the wavelength of the radiation. By taking these two differences into consideration, the number of carriers trapped by a trap level can be varied by varying the wavelength of the radiation while setting the dose of the ultraviolet radiation to a constant value. That is, the number of carriers trapped by the trap level differs according to the energy corresponding to the wavelength of the radiation. Based on this fact, the photocurrent which generates corresponding to the irradiation of a read-out light differs depending on the wavelength of the irradiated ultraviolet radiation.

Conclusively, if a plurality of ultraviolet radiations differing in wavelength region are each irradiated at the same dose to a diamond, it is possible to detect the difference in wavelength of the irradiated ultraviolet radiations by measuring the value of photocurrent induced by irradiating a read-out light. The experimentation performed above to obtain the results shown in FIGS. 1 to 6 can be interpreted as a case in which the total energy irradiated to diamond is varied by varying the dose of the ultraviolet radiations having the same wavelength region, i.e., the same radiant intensity spectrum.

The discussion above is confirmed by experimental data described below. The experimental data are obtained by splitting first the light emitted from a deuterium lamp into radiations of specified wavelength regions by means of a spectroscope. Then, by using the thus split ultraviolet radiation, the relation between the wavelength of the ultraviolet radiation and the value of photocurrent generated by the irradiation of a read-out light (white light) is investigated. It is confirmed from the experimental data thus obtained that a difference in photocurrent that generates upon irradiating a read-out light is found between a case of irradiating an ultraviolet radiation 180 nm in wavelength and a case of irradiating an ultraviolet radiation 200 nm in wavelength. As a matter of course, the dose is maintained equal for both cases. However, the radiant intensity of the initial light emitted from a deuterium lamp greatly reduces to 1/10 or lower of the initial value upon passing through the spectroscope. Accordingly, it was not possible to obtain a sufficiently large photocurrent on the irradiation of a read-out current. Hence, a clear relationship between the wavelength of an ultraviolet radiation and the photocurrent generated by the irradiation of a read-out light was unobtainable.

Considering the model described in the foregoing, the model above is applicable to a material satisfying the following conditions:

(1) that it has a photoconductive effect (i.e., that it is photosensitive);
(2) that it has a certain trap level to trap the excited electrons; and
(3) that it has an energy band gap.

The above conditions concerning the physical properties of a material can be fulfilled by using any type of a so-called semiconductor.

Based on the foregoing discussion, the present inventors have concluded that any material having the physical properties enumerated in (1) to (3) above by principle exhibit the optical characteristics shown in FIGS. 1 to 6 referred hereinbefore, and that the characteristics can be utilized as in the case of diamond. Conclusively, in other words any material other than diamond and having the physical properties enumerated in (1) to (3) above by principle provide experimental data shown in FIGS. 1 to 6 referred hereinbefore, and that the characteristics shown therein can be utilized.

By using any material having the physical properties enumerated in (1) to (3) above according to the conclusion, the discussion summarized previously can be more generalized as follows.

Firstly, information related to the total energy of a light (writing light) having a wavelength corresponding to an energy higher than the energy band gap of the material can be obtained from a photocurrent induced by a read-out light having a wavelength longer than that corresponding to the energy band gap of the material. In particular, the information corresponding to the total quantity of writing light irradiated to the material, or the information on the dose of the writing light can be determined with high precision.

Secondly, information can be read out repeatedly for a plurality of times by using a pulsed light for the read-out light.

Thirdly, the times of repeatedly reading out the information can be increased by using a light with longer wavelength as the read-out light.

Fourthly, the times of repeatedly reading out the information can be increased by using a light with a weaker intensity as the read-out light.

Fifthly, the written information can be erased by reading out the written information, i.e., by irradiating a light having an energy lower than the energy band gap of the material (read-out light), with a certain range of wavelength (to increase the total energy), with a certain dose (to increase the total energy), or with an increased duration of irradiation (to increase the total energy).

In the foregoing, the term "information related to the total energy of a light (writing light)" as referred in the first summary signifies at least one piece of information selected from whether the light having a wavelength corresponding to an energy higher than the energy band gap of the material to which the light is irradiated was irradiated or not, the difference in dose, the difference in wavelength, or the difference in the spectrum of radiant intensity; because if the total energy should differ, the difference is naturally reflected to the number of the trapped carriers.

Considering that the "generation of a photocurrent" is a phenomenon attributed to the carriers excited from their trap levels by the energy provided from a light (read-out light) having a wavelength corresponding to an energy lower than the energy band gap of the material, it can be readily understood that the energy of the photons in the read-out light is consumed for the excitation of the carriers from their trap level. The loss of photon energy in the read-out light signifies a decrease in the number of photons of the read-out light inside the material. However, because the read-out light has a wavelength corresponding to an energy lower than the energy band gap of the material, a large part of the read-out light must be transmitted through the material. Accordingly, on transmitting the read-out light through the material, the number of photons decreases in proportion to the number of carriers excited from their trap levels. In other words, it can be concluded that the quantity of the read-out light transmitted through the material decreases proportional to the number of carriers excited from their trap levels.

The fact that a large number of carriers are excited from their trap levels by the irradiation of a read-out light is directly related to the fact that a large photocurrent is obtained at the reading out of information. In other words, the fact signifies that the writing light is irradiated at a high dose. Thus, if the writing light is irradiated at a high dose, larger quantity of photons in the read-out light are lost in reading out the information during their transmission through the material. Thus, in such a case, the quantity of read-out light transmitted through the material decreases.

It can be seen from the discussion above that the number of photons lost upon reading out the information reflects the dose of the light irradiated for writing.

Based on the study above, by principal, the following conclusion is derived.

The dose of a light irradiated for writing on the material can be determined by the quantity of light transmitted through the material as a read-out light.

The conclusion above is established by taking the dose of the writing light into consideration. However, in the case where the wavelength of the writing light is varied while maintaining the dose at a constant value, the number of carriers trapped by the trap level is assumably different. Thus, by analogy, the following conclusion is derived.

The difference in the wavelength of a light irradiated for writing on the material can be determined by the quantity of light transmitted through the material as a read-out light.

Accordingly, at least a piece of information selected from the group consisting of whether a light is irradiated to the material for writing or not, the dose of a writing light irradiated to the material, and the difference in wavelength of a writing light irradiated to the material, can be determined by the quantity of light transmitted through the material as a read-out light.

In other words, the total energy of the light irradiated to the material for writing can be determined by the quantity of light transmitted through the material as a read-out light.

Specifically, for instance, the quantity of light transmitted through the material as a read-out light is considered for a case using a light irradiated at a dose of 10 µWs/cm$^2$ as the writing light, and for another case using a light irradiated at a dose of 20 µWs/cm$^2$ as the writing light. The number of carriers excited from their trap levels upon reading out the information differs depending on the dose of light irradiated for writing. Accordingly, the number of photons consumed inside the material also changes as to result in a differed quantity of transmitted light. Thus, the difference in the dose of the irradiated light for writing can be recognized based on the difference in the quantity of the light transmitted as a read-out light.

The present invention has been accomplished by conducting the study above, and is based on the findings that the difference in the dose or wavelength of the light irradiated for writing can be determined by observing the quantity of light transmitted as a read-out light.

An object of the present invention is to provide an electronic device having at least one of the functions shown below:

a function of detecting whether a light is irradiated or not, or a difference in the dose of irradiated light, and furthermore, a difference in the wavelength of light;

a memory function capable of processing a difference in the dose or the wavelength of light as a piece of information;

an arithmetic function capable of processing a difference in the dose or the wavelength of light as a piece of information;

a function capable of detecting information in correspondence with the total energy of light;

a memory function capable of processing information in correspondence with the total energy of light; and an arithmetic function capable of processing information in correspondence with the total energy of light.

According to an aspect of the present invention, there is provided an electronic device utilizing a material having a photoconductive effect, a trap level for trapping an excited carrier, and, wherein the device comprises:

a means for irradiating the material with a first light, the first light having a wavelength corresponding to an energy higher than the energy band gap of the material;

a means for irradiating the material with a second light, the second light having a wavelength corresponding to an energy lower than the energy band gap of the material;

a means for measuring the quantity of second light transmitted through the material; and a means for obtaining information on the first light illuminated to the material from the quantity of the transmitted second light.

The photoconductive effect as referred herein signifies a phenomena which is induced by irradiating a light to the material specified above, wherein pairs of electrons and holes are excited and generated as carriers by the photo energy absorbed by the material so that the electrical resistance of the material is decreased. The photoconductive effect is a representative characteristic known on any semiconductor material.

The energy band gap (also referred to simply as "band gap" or "energy band width") referred herein is the width of a forbidden band defined in the band theory. The trap level (also referred to simply as "trap") in which the excited carriers are trapped is characterized in that it captures the excited electrons and holes, and in that it is a level attributed to lattice defects, impurities, or dangling bonds that are present in the material. The energy level for the trap is included in the energy band gap. Although differing from material to material, a practically known material, particularly a semiconductor material, has a trap level for trapping the excited carriers. In an embodiment according to the present invention, there is no particular restriction as to use a material in which a trap level is intentionally incorporated. Still, it is useful to employ a material in which the number of trap levels for trapping the carriers is artificially controlled. As a means for artificially controlling the number of trap levels, mentioned are, for example, setting the conditions in fabricating the material, adding proper impurities, employing a proper means of heat treatment or irradiating a radiation, or irradiating a laser radiation or a microwave.

Preferably, for instance, a semiconductor material having a polycrystalline structure is used as a material having the trap levels for trapping the carriers. Such a material is preferred because numerous lattice defects and dangling bonds can be found in the grain boundary of the polycrystalline material. A generally known non-single crystal semiconductor material is also usable, because it contains a large number of lattice defects and dangling bonds. However, a structurally weak material which undergoes structural change in the molecular level upon irradiating an intense light is not suitable. For instance, a material which undergoes degradation similar to a case of amorphous silicon or phase change (such as crystallization or becoming amorphous) upon irradiating the first light or the second light according to the present invention is unsuitable. That is, a material usable in the present invention must have a stable structure in the molecular level and a distinct band structure.

A first light having a wavelength corresponding to an energy higher than the energy band gap of the material specified above signifies, for instance, in case of a material having an energy band gap of 5 eV, a light having a wavelength corresponding to an energy higher than 5 eV, i.e., a light having a wavelength shorter than about 250 nm. The first light may also have a wavelength in the range of from 200 to 300 nm, so long as the total energy (Σhν) for the light in the region of a wavelength longer than about 250 nm is practically negligible or affordable as compared with that (Σhν) for the light in the region of a wavelength shorter than about 250 nm. In case of the diamond, for instance, it is confirmed that a light emitted from a deuterium lamp having both spectral components corresponding to the wavelength region of the writing light (first light) and the read-out light (second light) is usable as a light source for the first light, so long as the total energy (which relates to the radiant intensity as well as to the energy corresponding to the wavelength) for the wavelength region necessary for writing is practically sufficiently intense as compared with that for the region unnecessary for writing (FIGS. 1 and 3).

FIG. 1 reads that, in general, the energy band gap for a semiconductor material, and particularly for a non-single crystal semiconductor material, is not distinct, but is rather broadened. Moreover, the energy band gap for a same material varies depending on the content of impurities and the crystalline state of the material. Accordingly, it is preferred to determine the wavelength region for the first and the second light based on the approximate value of the energy band gap, with some margin taken into consideration.

The means for irradiating light include various types of lamps, various types of laser generators, devices utilizing the energy of charged particles, devices which guide the radiation emitted from the light-emitting devices enumerated above (for instance, optical fibers and shutters for cutting off light), optics which selectively or non-selectively guide natural light which are found in nature, or constitutions which simply irradiate light (also included is a constitution in which light is exposed). In the constitution of the present invention, a first and a second light are clearly distinguished from each other by the wavelength corresponding to the energy band gap of the material to which the light is irradiated. Accordingly, the wavelength of the light to be irradiated to the material must be selected. In case of using a light having a spectrum distributed over a wide region in wavelength as the first light, for instance, it must be controlled as such that the desired information is written by the first light, but that the information is not read out by the light having the wavelength region corresponding to that of the second light. Thus, in such a case, light having its wavelength in a specified region must be selectively extracted as a first light, and then irradiated to the material. Accordingly, a proper filter must be incorporated to irradiate the first light to the material.

A second light having a wavelength corresponding to an energy lower than the energy band gap of the material as referred herein signifies, for instance, in case of a material having an energy band gap of 5 eV, a light haying a wavelength corresponding to an energy lower than 5 eV, i.e., a light having a wavelength longer than about 250 nm. As a matter of course, it is also possible to use a light having a wavelength in the shorter wavelength region of about 250 nm or less so long as reading out of information is effected without any problem.

The use of a laser radiation, which is a monochromatic light, is useful in the case where a light with a particular wavelength is used for the first or the second light described above. Various types of laser radiation ranging in the wavelength region of from an infrared region to an ultraviolet region can be used in accordance with the energy band gap of the material and the mode of carrying out the embodiment. It is also effective to use a solid laser (inclusive of a semiconductor laser) to realize a compact light-emitting unit.

In case of utilizing the dose of a first light as the information, for instance, the means for emitting a first light must have a function of emitting the radiation in different doses. On the other hand, the second light does not need a function of varying the dose thereof. It is also effective no use a pulsed light for the first and the second light from the viewpoint of writing and reading out information.

A means for measuring the quantity of second light transmitted through the material as referred above signifies a means which illuminate the material with a second light and which measures the quantity of said light transmitted through the material, i.e., a means for measuring the quantity of transmitted light. By measuring the quantity of the second light transmitted through the material per unit of time, the measured value is directly interpreted as the intensity of transmitted light. In short, the intensity of the second light transmitted through the material can be measured instead of the quantity of second light transmitted through the material. This can be clearly understood by considering that the quantity of light is expressed as a product of the radiant intensity and the duration of irradiating the light.

Because the second light has a wavelength corresponding to an energy lower than the energy band gap of the material, a known device for detecting light in the visible wavelength region, i.e., a photodiode utilizing silicon, can be employed as a means for measuring the quantity of second light transmitted through the material, provided that a material having a wide band gap such as diamond is used. In the case where a material having a narrow band gap such as single crystal silicon (having a band width of about 1.1 eV) is used, photodiodes having excellent sensitivity in a wavelength region of 1,000 nm or higher, such as those using germanium (Ge), indium arsenide (InAs), or InSb, can be employed. Furthermore, a photoreceptor element which is capable of taking out an amplified signal generated in the photodiode portion, for instance, an avalanche photodiode or a phototransistor, can be employed as a means for measuring the quantity of light. An image pickup tube can be used as well for the above means.

In the case where the accurate number of photons transmitted through the material must be measured, a photomultiplier tube is found useful.

On irradiating a second light to the material, the quantity of second light transmitted through the material contains pieces of information related to the dose and the wavelength of the first light. Accordingly, by investigating previously the relation between the dose of the first light irradiated to the material under consideration and the quantity of second light transmitted through the material, or the relation between the wavelength of the first light irradiated to the material under consideration and the quantity of second light transmitted through the material, or the relation between the combined information on the dose and the wavelength of the first light irradiated to the material under consideration and the quantity of second light transmitted through the material, it is possible to implement, for example, a photodetector device using the first light as the detecting means, a memory device using the first light as the writing light, or an element which utilizes the first light as an input and the transmitted second light as an output.

In case of using a light having a certain spectral distribution as the second light, photons may be absorbed depending on the wavelength during the transmission of the second light through the material to result in a transmitted light having an altered spectral distribution. That is, because absorption occurs on particular wavelength during the transmission of the second light through the material, the spectrum of the transmitted light may be changed. Thus, information on the irradiation of a first light can be obtained by detecting the change in spectrum. This can be interpreted as an operation for obtaining information on the first light (e.g., the dose thereof) irradiated previous to the irradiation of the second light, by detecting the change which occurs during the transmission in the quantity of a light component having a particular wavelength.

Any material widely known as a semiconductor can be used as a material required in the present invention to have a photoconductive effect, a trap level for trapping an excited carrier, and an energy band gap. Particularly preferred is silicon carbide (SiC) from the point of view that an operation similar to that of diamond is obtainable. A thin film of silicon carbide is expected to provide a function similar to that of a thin-film diamond, because it has an energy gap of about 3 eV and because it can be more readily fabricated than a thin-film diamond. It is also possible to use a non-single crystal semiconductor or a single crystal semiconductor. A material whose electrical resistance decreases upon irradiation of a light due to the generation of free electron-hole pairs, known as a photoconductive material, is also usable. A compound semiconductor or a semiconductor containing impurities added therein may be used as well, so long as it satisfies the conditions specified by the present invention.

In case of using silicon carbide, for instance, a light emitted from a KrF excimer laser operated at a wavelength of 248 nm (corresponding to an energy of 5 eV) or that from mercury vapor lamp having a peak intensity in the spectrum of 400 nm or less in wavelength can be used as a first light for writing information. A light emitted from a He—Ne gas laser operated at a wavelength of 633 nm (corresponding to an energy of about 2 eV) or that from a semiconductor laser operating in the visible wavelength region (from 700 to 800 nm in wavelength) may be used as a second light for reading out information.

When a material having a narrow energy band gap is used, there may be cases in which the dose of a first light is found practically unfeasible to read out by measuring the quantity of the second light transmitted by the material. As described hereinbefore, the information on the first light is assumed to be stored in the trap levels that are present in the energy band gap. Thus, in case of a material having a narrow energy band gap, relatively less information on the first light is stored as compared to a case of diamond having an energy band gap of 5 eV or more.

The discussion above also applies to a case in which light differing in wavelength is used as the first light. In the case where a material having a narrow band gap is used, more specifically, even if a plurality of first light differing in wavelength from each other should be prepared in correspondence with the pieces of information to be written on the material, the difference in the written information would not be detected by the difference in the quantity of second light transmitted through the material. Diamond has a wide energy band gap and an extremely stable structure in molecular level. Hence, diamond is a favorable material for use in the present invention.

However, in case of simply reading out from the quantity of second light transmitted through the material, whether a first light is irradiated or not, the comparative size of dose of the first light, or the difference in wavelength of the first light, the material can be selected from a variety of materials depending on the characteristics required to be read out.

Also it is possible to use boron nitride (cBN), a material known to have physical properties similar to those of diamond. Moreover, by means of impurity-doping, the materials enumerated above may be rendered one conductivity type, and thereby the electrical conductivity thereof may be modified. Furthermore, by conducting impurity-doping or by modifying the compositional ratio of a material containing a plurality of components (e.g., SiC and compound semiconductors), or by controlling the conditions of fabrication, it is also effective to control the energy band gap of the material, the sensitivity of the material to light, the density of carriers, the absorbance of light, or the depth and number of trap levels.

According to another aspect of the present invention, there is provided an electronic device which comprises reading out the information on the first light illuminated to the material from the quantity of the transmitted second light. The term "quantity of the transmitted second light" as referred herein include the intensity of the transmitted light (i.e., the quantity of light transmitted per unit of time).

Accordingly, the quantity of the transmitted light (a product of intensity and time) or the intensity of the transmitted light (a product of intensity and unit time) is measured depending on the mode of carrying out the embodiment.

According to another aspect of the present invention, there is provided an electronic device described above, wherein the information on the first light is whether the first light is irradiated to the material or not. In the constitution according to the present aspect, the information consists of "0" and "1".

According to a still other aspect of the present invention, there is provided an electronic device described above, wherein the information on the first light is the dose of the first light irradiated to the material. In the constitution according to the present aspect, not only a digital information consisting of "0" and "1", but also two types of information or more can be treated. For instance, if four types of radiation having a dose of 5 $\mu Ws/cm^2$, 10 $\mu Ws/cm^2$, 15 $\mu Ws/cm^2$, and 20 $\mu Ws/cm^2$ are used for the first light, four types of information can be treated in a single region by discriminating the quantity of the transmitted second light according to each of the four types of the light differing in dose. By principle, more pieces of information can be treated in a single region of the material by improving the precision of reading out the second light.

According to a yet other aspect of the present invention, there is provided an electronic device described above, wherein the information on the first light is the difference in wavelength of the first light irradiated to the material. The constitution according to the present aspect utilizes the fact that the quantity of transmitted second light differs depending on the difference in wavelength of the first light irradiated to the material. For instance, a light having a wavelength of 160 nm (in correspondence with information A) and another light having a wavelength of 200 nm (in correspondence with information B) are prepared, and either light is irradiated to a thin film of polycrystalline diamond used as the material. Then, by discriminating the difference in the quantity of the transmitted second light, one can know which of the two, i.e., the light having a wavelength of 160 nm or the light having a wavelength of 200 nm, is irradiated to the thin-film diamond. In the case where both types of light are irradiated at the same time, the quantity of transmitted second light assumably differs from a case of irradiating either of the monochromatic light above. Accordingly, this case can be assigned to information C. By assigning a state of null information to information D, the following four types of information can be written on the material:

A: a state in which a light having a wavelength of 160 nm is irradiated as a first light;

B: a state in which a light having a wavelength of 200 nm is irradiated as a first light;

C: a state in which a light having a wavelength of 160 nm is irradiated simultaneously with a light having a wavelength of 200 nm to provide a first light; and D: a state in which no first light is irradiated.

In case of writing the four types of information above, the dose of each of the light must be fixed. If the dose of a first light should be changed, the quantity of the transmitted second light also changes. However, by taking advantage of this phenomena, a plurality of pieces of information can be treated without complicating the means of irradiating a first light. More specifically, a plurality of combinations obtained by differing the wavelength of the first light and by differing the dose thereof can be each assigned to different pieces of information.

In the example above, for instance, let the dose of light be differed in two levels, i.e., 10 $\mu Ws/cm^2$ and 20 $\mu Ws/cm^2$, or two types of light be prepared. Thus, the following four types of information can be obtained:
A: a light having a wavelength of 160 nm;
B: a light having a wavelength of 200 nm;
C: a dose of 10 µWs/cm$^2$; and
D: a dose of 20 µWs/cm$^2$.

By combining the four types of information above, nine types of information, i.e., combinations AC, AD, ABC, ABD, AC·BD, AD·BC, AD·BD, and AC·BC, and a state of null irradiation, can be treated. Thus, the example above comprises preparing a plurality of light differing in wavelength (two types in this case) and a plurality of light differing in dose (two types in this case), and the combination thereof are each assigned to a piece of information.

According to another aspect of the present invention, there is provided an electronic device described above, wherein the first light is irradiated simultaneously with the second light. In the first and the second aspect of the present invention, the operation of the device is based on reading out the information concerning the irradiation of the first light on the material by using the quantity of second light transmitted through the material. However, this operation can be effected during irradiating the first light to the material. In such a constitution, the information on the first light irradiated before irradiating the second light can be obtained from the quantity of second light transmitted through the material.

According to a still other aspect of the present invention, there is provided an electronic device described above, wherein the second light is irradiated after irradiating the first light. The basic operation of the present aspect comprises reading out the information on the irradiation of the first light by irradiating a second light upon completion of the irradiation of the first light. The mode of the operation is particularly important for a memory function, and provides the base of an operation of reading out an already written piece of information.

According to a yet other aspect of the present invention, there is provided an electronic device described above, wherein the spectrum of the transmitted second light is measured. In case of using a light having a certain spectral distribution as the second light, light corresponding to a part of the wavelength or the entire light may be absorbed by the material during the transmission thereof through the material to result in a transmitted light having an altered spectrum. Thus, by detecting the change in spectrum, the quantity of transmitted second light absorbed by the material can be determined, and thereby information on the irradiation of a first light, such as the dose and the difference in wavelength thereof, can be obtained.

The term "spectrum" as referred herein signifies a spectroscopically obtained intensity distribution of a light with respect to wavelength. For example, the spectrum can be visually expressed by taking wavelength on the abscissa and the intensity of light on the ordinate, and plotting the intensity of light corresponding to each of the wavelengths.

The constitution described above is effective when a light distributed over a certain range of wavelength is used as a second light.

According to another aspect of the present invention, there is provided an electronic device having an input and an output, or a method of operating the same, wherein a first light is used as the input, and the transmitted second light is used as the output. More specifically, the present aspect provides a constitution which comprises inputting information in the material by using the first light, and outputting the information by means of the second light. Furthermore, the present aspect provides a constitution in which the quantity of second light transmitted through the material is controlled by the first light. By using the present constitution, an arithmetic unit utilizing light is provided. The device according to the present constitution is characterized in that it has a memory function which stores the input information.

According to a yet other aspect of the present invention, there is provided an electronic device as described above, wherein the relation below is satisfied:

$$E_2 < E_g < E_1$$

where $E_g$ represents the energy band gap of the material, $E_1$ represents the energy corresponding to the wavelength of the first light (photon energy), and $E_2$ represents the energy corresponding to the wavelength of the second light (photon energy).

According to a still other aspect of the present invention, there is provided an electronic device as described above, wherein the relation between the energy band gap of the material and the first and the second light is established by using an equation. The relation among the energies of the light and the material specified above can be interpreted as follows:

$$\lambda_1 < \lambda_g < \lambda_2,$$

where $\lambda_1$ represents the wavelength of the first light, $\lambda_g$ represents the wavelength corresponding to the energy band gap of the material, and $\lambda_2$ represents the wavelength of the second light.

The two relations above states that only the light satisfying the relation contribute substantially to the function of the present invention. However, a light of a wavelength not satisfying the above relations may be included so long as it has no or negligible effect on the function of the present invention. Considering that $E_g$ cannot be clearly determined, the relation above cannot be strictly defined in the vicinity of $E_g$ or $\lambda_g$.

Furthermore, concerning that the light having an energy corresponding to $E_g$ (having a wavelength of $\lambda_g$) functions as a first light and a second light, the relation above in a strict sense should be written as $$E_2 \leq E_g \leq E_1.$$

However, as described in the foregoing, $E_g$ itself is not an absolute value. Accordingly, in practice, some margin is included in $E_g$ to provide a more reasonable relation as follows:

$$E_2 < E_g < E_1.$$

According to another aspect of the present invention, there is provided a method for operating an electronic device as described above, wherein, after irradiating the second light, the first light is irradiated in correspondence with the quantity of the transmitted light which changes upon irradiating the second light.

The problem concerning the change in the quantity of the transmitted second light, which is induced by the repeated irradiation of the second light, can be overcome by the constitution above. The above problem can be more readily understood by interpreting it as follows. On irradiating a first light to the material, carriers are trapped in the trap levels of the material at a number corresponding to the dose of the first light. By then irradiating a second light to the material, the carriers trapped in the trap levels can be excited in the expense of the photon energy of the second light. That is, photons corresponding to the number of the excited carriers are lost during the irradiation of the second light to the material. This signifies that the quantity of the transmitted second light is influenced by the number of carriers excited from the trap levels in the material. As described hereinbefore, the number of carriers excited from the trap levels in the material by the irradiation of the second light reflects the number of carriers trapped in the trap levels. Thus, the number of carriers decreases if carriers are released from their trap levels by irradiating a second light. Because the quantity of transmitted light reflects the number of carriers, the quantity of transmitted light after repeated irradiation results less than that obtained in the previous times of irradiating the second light. In practice, the information can be obtained accurately even after repeated read-outs by using, for example, a pulsed monochromatic light for the second light. By principle, however, the fact above can be explained as described in the foregoing.

Accordingly, carriers are replenished by irradiating the first light after the carriers are excited and released from the trap levels of the material by the irradiation of the second light. In this manner, the number of carriers trapped in the trap levels of the material is maintained apparently constant.

By taking the constitution above, a constant output (the quantity of second light transmitted through the material) particularly useful for a memory device can be obtained even when reading out is effected repeatedly.

A specific example of operation is described below.

(1) After irradiating a second light to the material to once read out a predetermined information written in the material, the change in the quantity of second light transmitted through the material is measured, and the dose of the first light to compensate for the change is determined and the data thus obtained is memorized by a semiconductor memory.

(2) Every time the predetermined information above is read out in the form of the quantity of second light transmitted through the material, the first light is irradiated according to the data memorized by the semiconductor memory after the irradiation of the second light, i.e., the reading out of the information. In such a manner, the quantity of second light transmitted through the material is maintained constant in the subsequent read-outs (the irradiation of the second light).

The operation above can be considered in analogy with a case of effecting a refreshing operation on the written information every time reading out occurs. Thus, even after reading out is repeated for a plurality of times, a constitution which provides the same output can be implemented by repeating the operation above.

The operation above provides an example for a case in which the information is refreshed every time reading out is effected. However, a similar operation can be effected after reading out is repeated for a plurality of times. Furthermore, the example above utilizes the difference in dose of the first light as the information to be written on the material. However, the same operation as above can be applied in the case where the difference in wavelength or the combination of the dose and the difference of wavelength are used for the information. In such cases, a light satisfying the conditions for a first light is prepared for use especially for refreshing the data, and is irradiated at a predetermined dose necessary for refreshing the data.

The dose necessary for refreshing the data every time the information is read out differs depending on the written information. In such a case, the dose corresponding to each piece of written information (which is revealed upon reading out) must be determined previously, so that the light necessary for data refreshment may be irradiated accordingly.

The information written by using a first light can be maintained in the manner described in the foregoing. However, the written information can be erased by irradiating, for example, white light, an intense light, a light at a high dose, or a light satisfying the conditions for a second light and having a wavelength as short as possible (a high photo energy). In this manner, the carrier trapped in the trap levels inside the material can be completely excited.

According to another aspect of the present invention, there is provided an electronic device as described above, wherein the lower limit in the wavelength of the first light is determined by the lower limit of the region of wavelength in which the material has photo sensitivity, and the upper limit in the wavelength of the second light is determined by the upper limit of the region of wavelength in which the material has photo sensitivity.

The present invention utilizes a phenomena in which carriers are excited from the trap levels by irradiating a second light, and assumes that the material exhibits a photoconductive effect. That is, it is necessary in the present invention that, on applying a photo energy, electron-hole pairs are generated by excitation, and that the electrical resistance of the material changes accordingly.

The fact that the material exhibits a photoconductive effect signifies that the material has photosensitivity for a light of particular wavelength, and an example of the effect for a thin film of polycrystalline diamond is given in FIG. 1.

The photoconductivity of a semiconductor material may be intrinsic or extrinsic (for details, reference can be made to "Handbook of Optical Properties", fifth edition, published on Dec. 10, 1989 by Asakura shoten, pages 557 and 558).

Photoconductivity of intrinsic type can be observed on, for example, germanium (Ge) or selenium (Se). These materials exhibit a photoconductive effect, i.e., has photosensitivity, even for a light having a wavelength longer than that corresponding to the energy band gap because of the presence of impurities, lattice defects, etc. Examples of the extrinsic-type photoconductivity can be found in germanium and the like doped with impurities such as gold (Au) or copper (Cu). These materials also exhibits photosensitivity, i.e., photoconductive effect, for light having a wavelength longer than that corresponding to the energy band gap. The photosensitivity observed for the light in the wavelength region longer than that corresponding to the energy band gap occurs by the excitation of carriers to the trap levels formed by the impurities or lattice defects, or by the excitation of the carriers from the trap levels. At any rate, impurities and lattice defects are practically present. Hence, photoconductive effect is observed for a light having a wavelength longer than that corresponding to the energy band gap of the material.

Because the present invention takes advantage of the photoconductive effect described above, an embodiment according to the present invention excludes a material which does not exhibit a photoconductive effect (i.e., a material having no photosensitivity), or a material whose photoconductive effect cannot be utilized (any material having a band gap exhibits a photoconductive effect; what counts is the degree of the effect). In other words, materials having negligible photosensitivity or practically unfeasible materials cannot be utilized in the embodiments of the present invention.

The lower limit in wavelength for the first light and the higher limit in wavelength for the second light in the embodiments of the present invention can be fixed considering whether the material has photosensitivity or not for the light of the wavelength under consideration. In other words, the limits above can be set by taking into consideration whether the material exhibits a photoconductive effect or not for the light having the particular wavelength. For instance, FIG. 1 reads that the thin-film diamond fabricated by means of chemical vapor deposition (CVD) has photosensitivity for a light in a wavelength region of from about 950 nm (corresponding to an energy of about 1.3 eV) to about 200 nm (about 6.2 eV). Thus, so long as the data in FIG. 1 are considered, the first and the second light are selected in a wavelength region of from about 200 to about 950 nm with a boundary for separating the first and the second light from each other being set at a wavelength corresponding to the energy band gap of the thin-film diamond.

A diamond loses photosensitivity at a wavelength of 1,000 nm or longer, and according to the present inventors study, it still has photosensitivity for a light having a wavelength as long as about 1,200 nm. As described in the foregoing, the photosensitivity for a light in a wavelength region longer than that corresponding to the energy band gap is attributed to the impurities and lattice defects incorporated in the material. Accordingly, the limit in the longer wavelength side assumably depends on, for example, the method of fabricating the material, the crystal state of the material, and the concentration of the impurities.

It is well established that diamond (single crystal diamond) exhibits photosensitivity to radiations such as X-ray and γ-ray. More specifically, when X-rays or γ-rays are irradiated to a single crystal diamond while applying bias thereto, it is confirmed that a photocurrent generates in the crystal at a quantity in proportion to the irradiated energy.

Thus, in the case where diamond is used as the material, any light having a wavelength ranging from a value corresponding to an energy of about 5.5 eV to a shorter wavelength region for γ-rays can be used for the first light, and any light having a wavelength longer than that corresponding to an energy of about 5.5 eV and up to a wavelength region for infrared radiation can be used for the second light.

Materials such as single-crystal silicon and single-crystal germanium are known as the materials having photosensitivity for X-rays and γ-rays. An X-ray detector using single-crystal silicon is already put into practice.

As described in the foregoing, the lower limit in wavelength for the first light and the upper limit in wavelength for the second light depend on the photosensitivity of the material to be used in the device. In other words, the upper and the lower limits of the wavelength region in which the photosensitivity of the material is obtained in a practically feasible manner are the key for determining the lower limit in wavelength for the first light and the upper limit in wavelength for the second light.

The value of the photosensitivity by which the lower limit in wavelength for the first light is determined may differ from that by which the upper limit in wavelength for the second light is determined. Referring to FIG. 1, for instance, the photosensitivity of a thin film of polycrystalline diamond (plotted with filled circles) for a light having an energy of 6 eV differs from that for a light having an energy of 3 eV. However, a light with an energy of 6 eV and a light with an energy of 3 eV both can be used as the second light.

The physical significance of the upper limit in wavelength for the second light can be interpreted as follows.

As described in the foregoing, the photosensitivity exhibited by the material for a light having a wavelength corresponding to an energy lower than the energy band gap of the material is attributed to the trap levels that are formed within the energy band gap of the material due to the presence of impurities and lattice defects in the material. Accordingly, the presence of trap levels can be recognized by the upper limit in wavelength posed on the photosensitivity of the material. For instance, the trap levels for a thin-film diamond whose photosensitivity is shown in FIG. 1 can be found in a depth corresponding to an energy of about 1.3 eV (about 950 nm in wavelength).

In the vicinity of the lower limit in wavelength of the first light, on the other hand, the absorption of light occurs around the surface of the material. Accordingly, in general, the lifetime of the carriers becomes shorter due to the influence of the defects and impurities that are taken up by the surface of the material, because the surface contains more impurities and defects than the inside of the material. In short, the observed photosensitivity becomes lower than the theoretical value. However, in spite of the decrease in photocurrent, carriers are more excited by the high photon energy. Accordingly, the phenomena of forming electron-hole pairs becomes more distinct. That is, the quantum efficiency becomes higher, and the sensitivity to light is not always lowered.

Thus, assumably, even if a material having a low observed photosensitivity for the first light (that is, a material which yields low photocurrent) is used, the material can be used for writing information thereon by utilizing the first current and for reading out the information by means of the second light so long as the material has a function of generating electron-hole pairs. It can be seen from the foregoing that the minimum value of photosensitivity for the material in setting the lower limit in wavelength of the first light must be determined by taking the above facts into consideration.

Moreover, the lower limit in wavelength of the first light must not correspond to such an intense light with which a crystal structure of the material would be modified. That is, the determined wavelength must not correspond to such an intense photon energy capable of modifying the material.

By taking the above discussion and the practical problems into consideration in case of using a general type of semiconductor material, it is assumed proper to set the lower end in wavelength for the first light in an ultraviolet wavelength region corresponding to an energy not lower than the energy band gap of the material. In case of using a material having a wide energy band gap, such as diamond and cubic boron nitride, or in case of using a semiconductor material having sensitivity to X-rays and γ-rays, the lower end in wavelength for the first light can be extended to a wavelength region inclusive of X-rays and γ-rays. On using a light having a wavelength shorter than the ultraviolet wavelength region for the first light, it is preferred to use a material having a stable crystal structure well resistant to a high photon energy, represented by, for example, diamond.

The upper limit in wavelength for the second light is determined depending on whether the material has photosensitivity or not. However, in general, the upper limit can be set in the infrared wavelength region. If a second light having an excessively long wavelength should be used, the material suffers problems concerning heating and low resolution.

The discussion above also applies to a case of employing a method of obtaining information on the first light (such as the dose and the wavelength thereof) by irradiating the second light to the material and measuring the photocurrent induced in the material, as shown in FIGS. 2 and 5.

According to a yet other aspect of the present invention, there is provided an electronic device as described above, wherein the intensity of the transmitted light is determined by measuring the quantity of light transmitted per unit of time.

The quantity of transmitted light is equal to the radiant intensity integrated over the irradiation time (if the radiant intensity should be maintained constant, the value equals to the product of radiant intensity and the irradiation time). Accordingly, the quantity of light transmitted per unit of time is equal to the radiant intensity. Thus, in the embodiments according to the present invention, the intensity of the transmitted second light may be measured in the place of the quantity of transmitted second light.

Conclusively in the present invention, a first light having a wavelength corresponding to an energy higher than the energy band gap of the material is irradiated to a specified material. Information related to the first light irradiated to the material is thus stored in the material.

Then, during or after the irradiation of the first light, a second light having a wavelength corresponding to an energy lower than the energy band gap of the material is irradiated to the material. By measuring the quantity or the intensity of the second light transmitted through the material, the information related to the first light can be obtained. In particular, information corresponding to the dose of the first light can be obtained from the quantity of the transmitted second light.

DESCRIPTION OF THE PREFERRED EMBODIMENTS OF THE INVENTION

The present invention is described in further detail below referring to non-limiting examples.

The examples below refer to cases in which diamond (particularly a thin film of polycrystalline diamond fabricated by CVD) is used as the material, however, basically any material having a photoconductive effect, a trap level for trapping an excited carrier, and an energy band gap, can be used in the place of diamond in the constitutions described below. For example, compound semiconductors based on nitrides and having a wide energy band gap can be used.

On using a material other than diamond in the examples below, however, basically the relation below must be fulfilled:

$$E_2 < E_g < E_1$$

where Eg represents the energy band gap of the material, $E_1$ represents the energy corresponding to the wavelength of the first light (writing light), and $E_2$ represents the energy corresponding to the wavelength of the second light (read-out light). However, a light in a wavelength region not satisfying the above relation may be included, provided that its energy is low enough and its influence on the light satisfying the relation above remains negligible or affordable.

EXAMPLE 1

Figure 1:
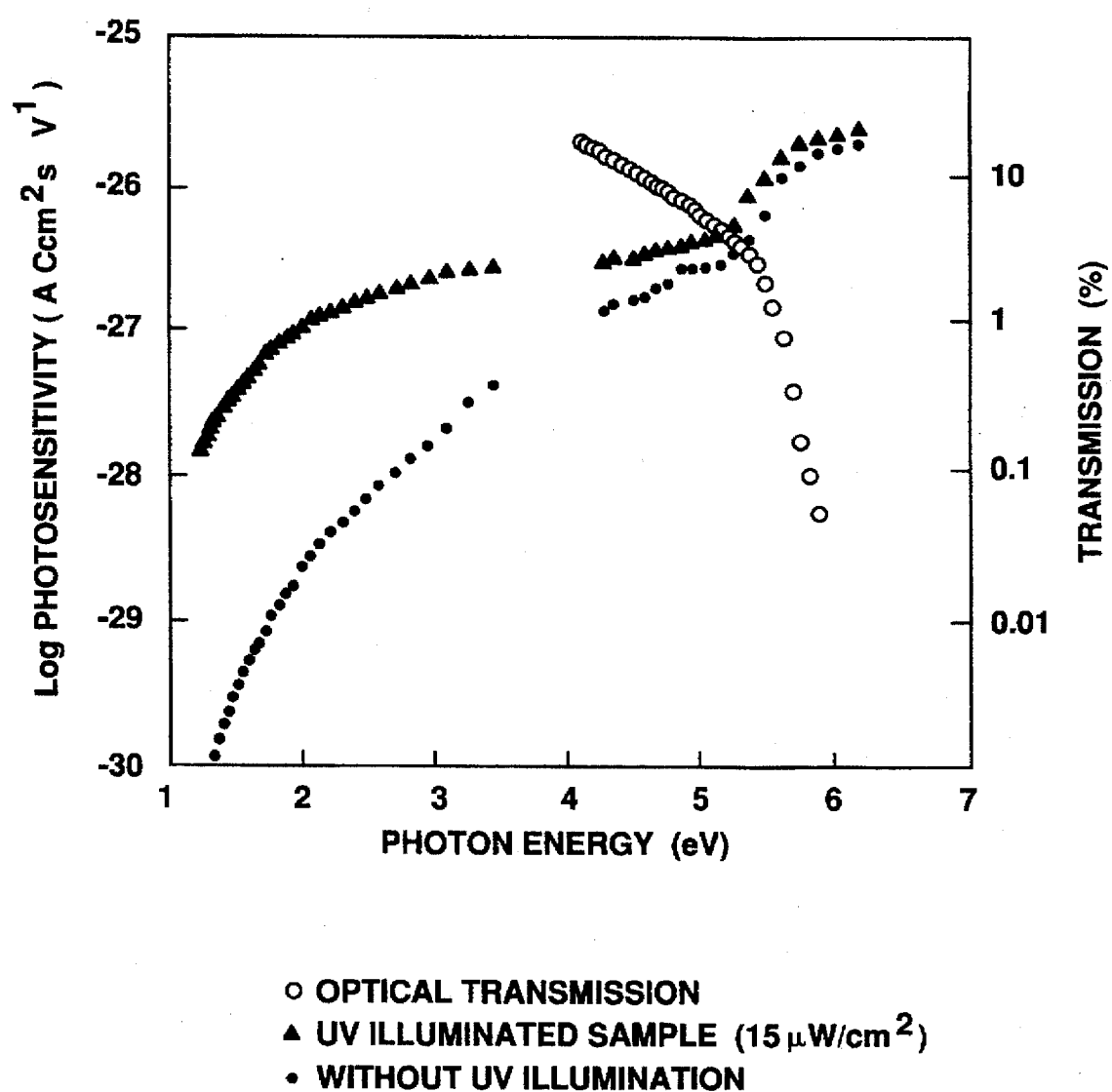
FIG. 1 is a graph showing a relation between an energy corresponding to the wavelength of a light irradiated to a thin-film diamond and a photosensitivity of the thin-film diamond.
Figure 2:
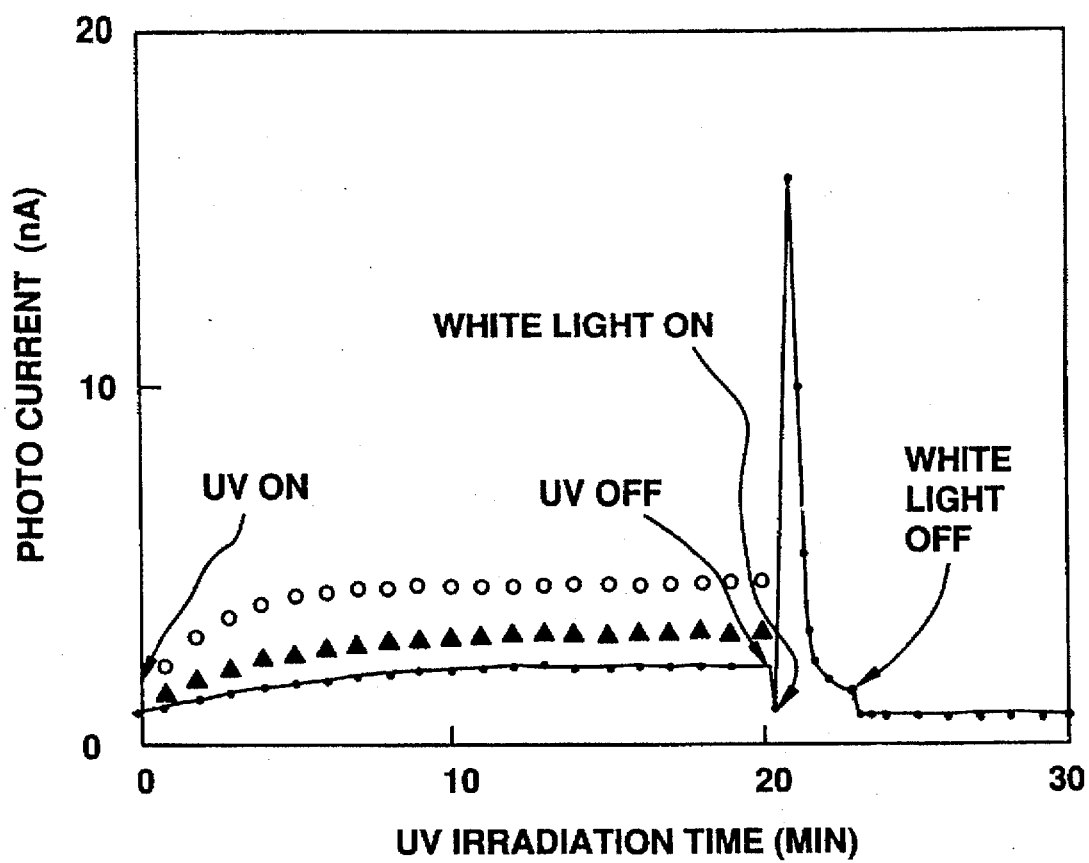
FIG. 2 is a graph showing a relation between the time of irradiating an ultraviolet radiation to a thin-film diamond and photocurrent, and a change in photocurrent upon irradiating white light after turning off the ultraviolet radiation.
Figure 3:
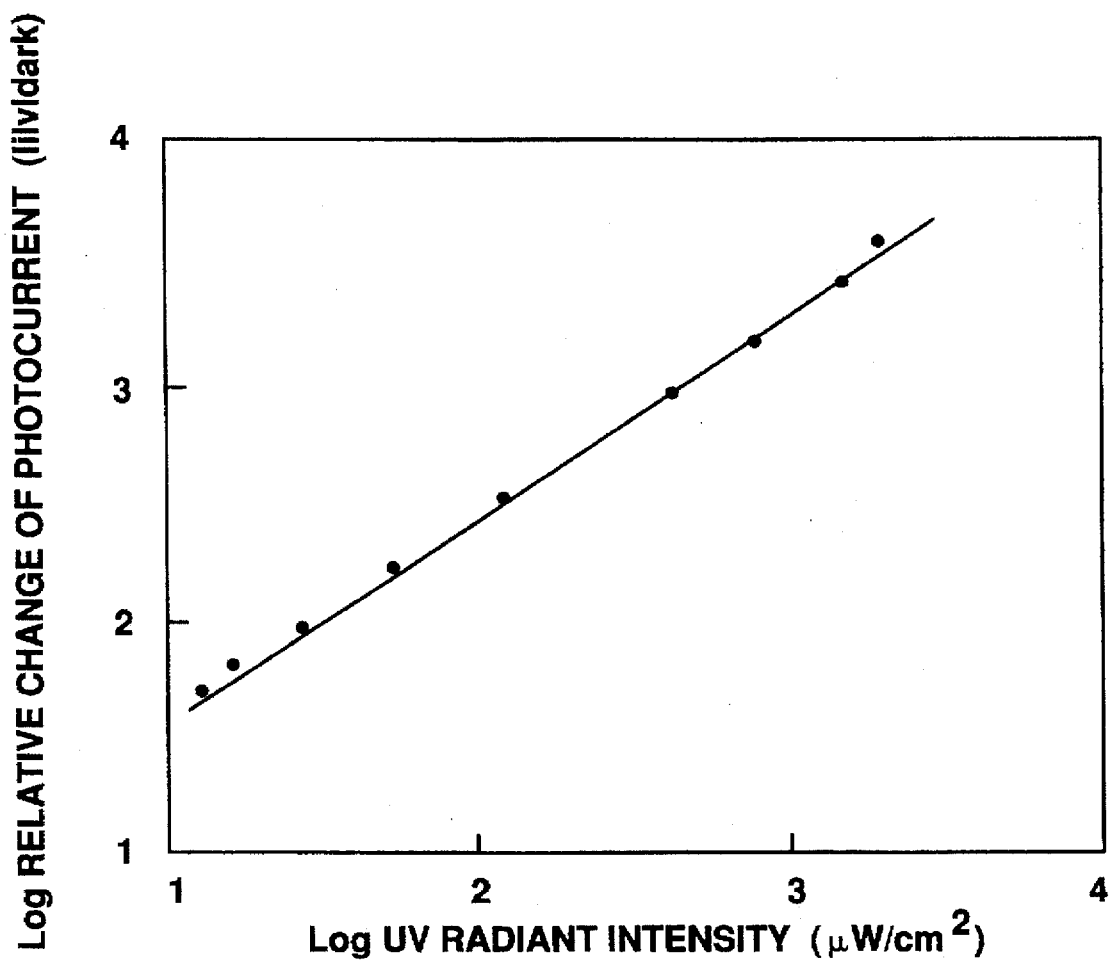
FIG. 3 is a graph showing a change in the ratio of illuminated current and dark current in a thin-film diamond with increasing radiant intensity.
Figure 4:
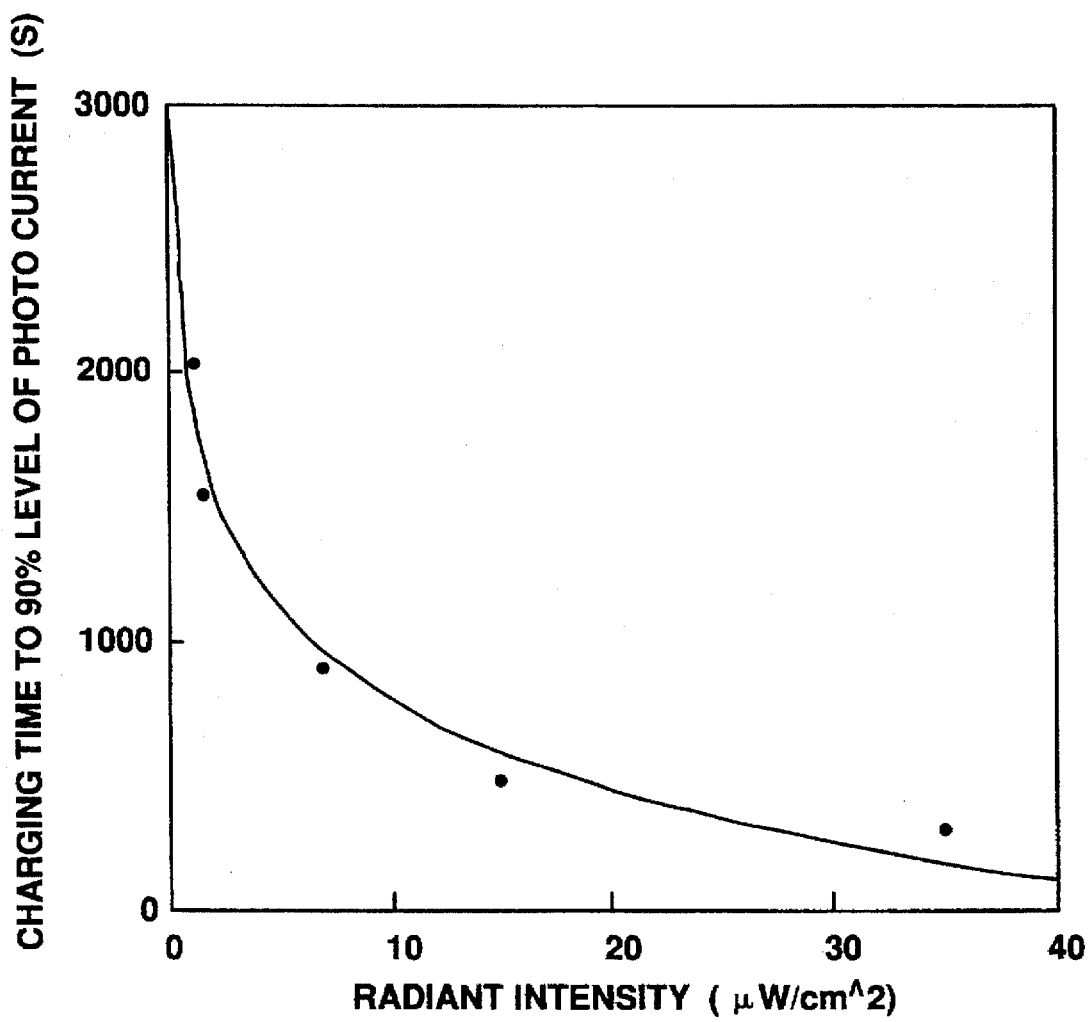
FIG. 4 is a graph showing a change in time necessary for attaining 90% saturated photocurrent in a thin-film diamond with increasing radiant intensity.
Figure 5:
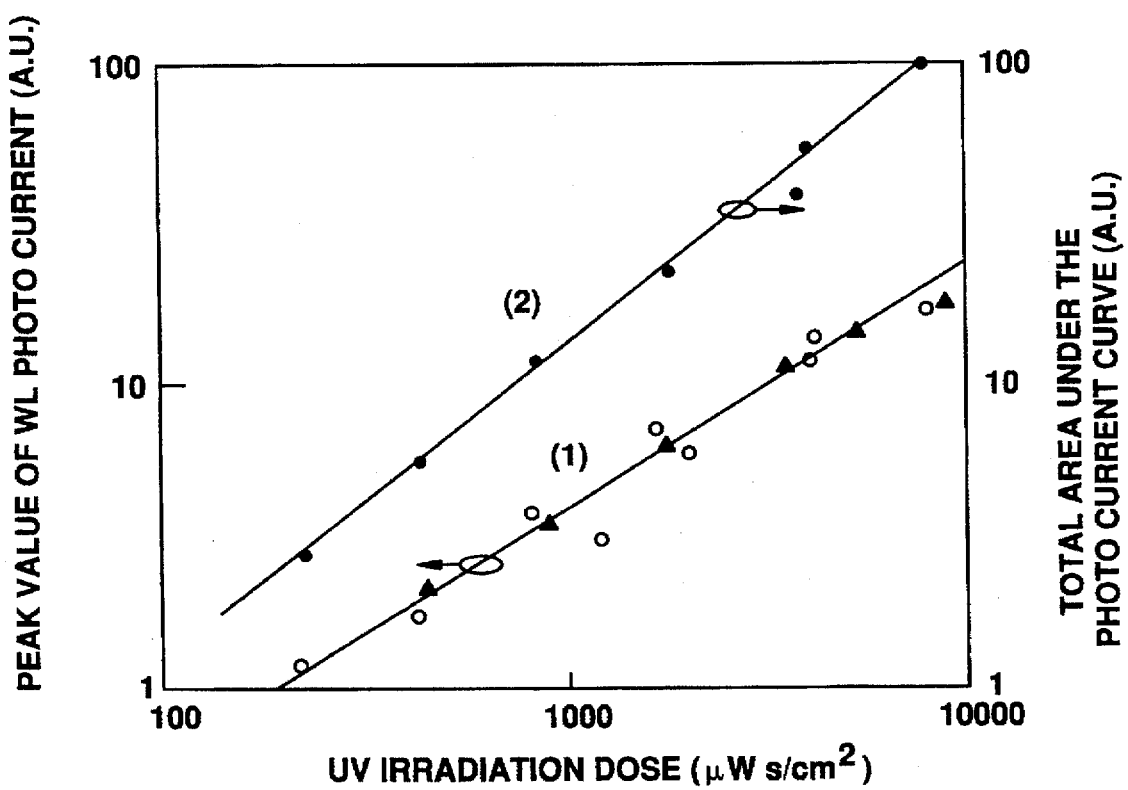
FIG. 5 is a graph showing a change in photocurrent upon irradiating white light to a thin-film diamond with increasing the dose of the ultraviolet radiation.
Figure 6:
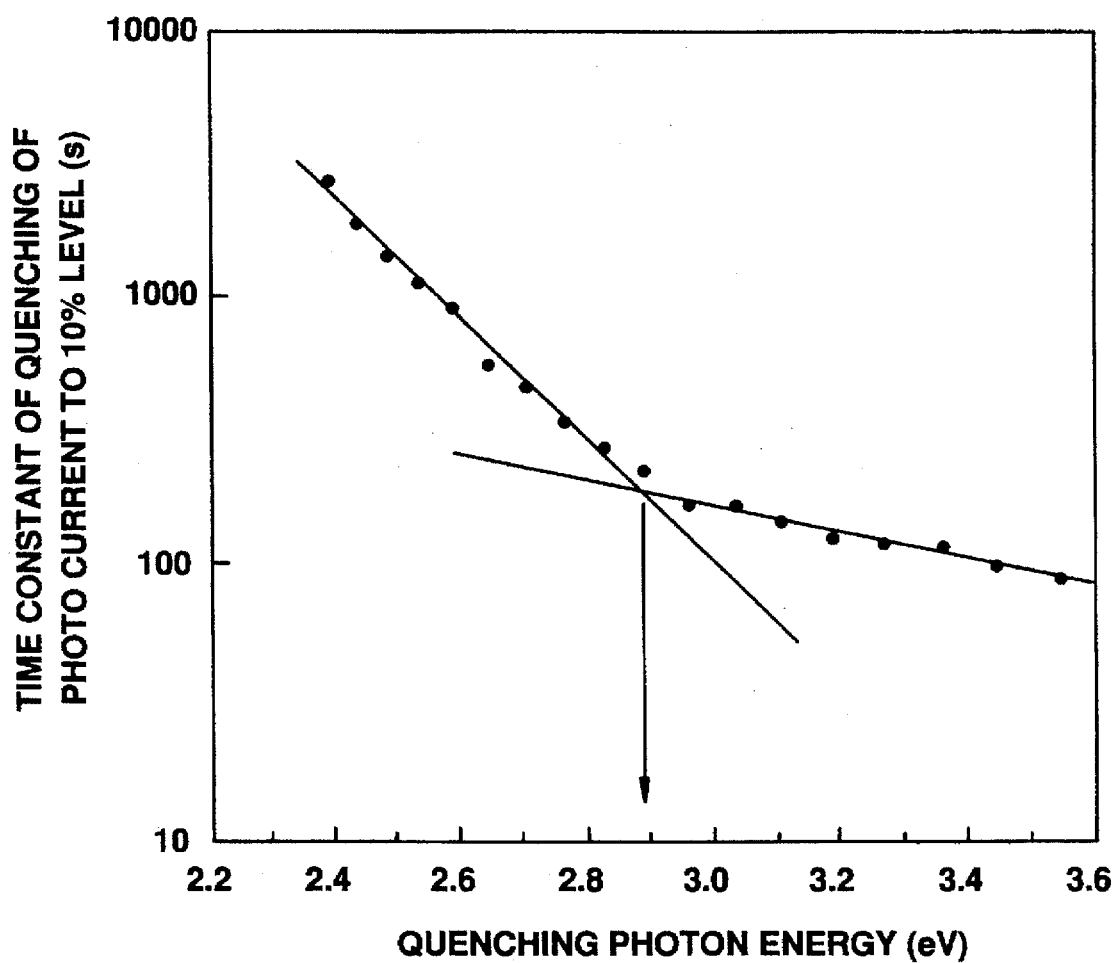
FIG. 6 is a graph showing a relation between time necessary for attaining 90% reduced photocurrent in a thin-film diamond and an energy corresponding to the wavelength of light irradiated after irradiating ultraviolet radiation.
Figure 7:
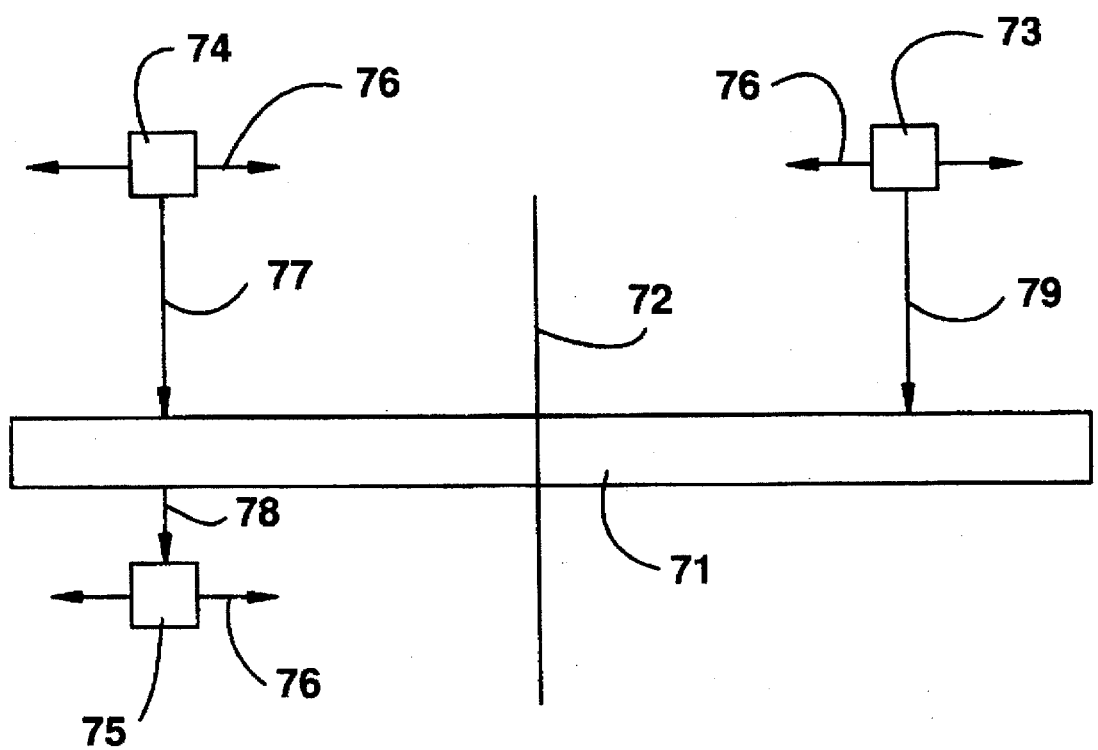
FIG. 7 shows schematically a disk memory device according to an embodiment of the present invention.

The present example relates to a disk-type device with reference to the schematically drawn cross section view given in FIG. 7. In the device illustrated in FIG. 7, information is written in or read out from a predetermined memory region by rotating the disk; hence information is input or drawn out from the device.

The constitution of the present example comprises irradiating a writing light to the disk, thereby writing information corresponding to the dose of the writing light in the memory region of the disk (for example, a region about 2 μm×2 μm in area), and then reading out the written information by measuring the quantity of the transmitted read-out light.

Referring to FIG. 7, the constitution of the device of the present example is described below. FIG. 7 shows a schematically drawn cross sectional view of the device. In FIG. 7, the device comprises a disk of thin-film diamond 71 which rotates around a rotary shaft 72, a means 73 for irradiating a writing light 79 which has a deuterium lamp which emits light in a wavelength region of from 180 to 350 nm to provide the writing light 79, a shutter to cut off light, a means for controlling the quantity of light, and other optical systems, a means 74 for illuminating read-out light which has a GaAs-based semiconductor laser operated in the visible wavelength region to emit a read-out light 77 having a wavelength of 780 nm, an optical shutter, a means for controlling the quantity of light, and other optical systems, and a unit 75 for use in measuring the transmitted light (sometimes referred to simply hereinafter as "a measuring unit"), equipped with a known spectrometer for a light in a visible wavelength region or element (for example, a photodiode or a phototransistor using silicon) having a function of measuring the intensity of a light in the visible wavelength region, with which the read-out light 78 transmitted through the thin-film diamond 71 is measured.

The means 73 for use in irradiating the writing light, the means 74 for use in irradiating the read-out light, and the unit 75 for use in measuring the transmitted light can be scanned in lateral directions as indicated with arrows 76. Accordingly, by rotating the disk made of thin-film diamond 71, the means and unit above can be scanned over the entire thin-film diamond. In particular, the means 74 for use in irradiating the read-out light is moved synchronously with the movement of the unit 75 for use in measuring the transmitted light, so that the light 78 irradiated from the means 74 and transmitted through the thin-film diamond 71 may always be measured by the unit 75 for use in measuring the transmitted light.

Although not shown in the figure, other components such as amplifiers for amplifying various types of signals, arithmetic units, and semiconductor memories are also placed depending on the requirements. It is also useful to reinforce the thin-film diamond 71 by providing a laminate of a resin substrate and the like to the thin-film diamond 71 on the side of the measuring unit 75.

The thin-film diamond 71 is a disk 10 cm in diameter and 15 μm in thickness, and is fabricated by microwave CVD under a magnetic field. More specifically, the thin-film diamond may be fabricated by CVD using a mixed gas of methanol and hydrogen as the starting material on a silicon substrate, while maintaining the substrate temperature at 800° C. and applying microwave at an output of 4 kW (2.45 GHz). In general, thin-film diamond fabricated by a vapor phase process (CVD) is polycrystalline and has a strong and stable crystal structure. Moreover, the thin-film diamond thus obtained is suitable for use in the constitution of the present invention because it has a large energy band gap.

In the present example, a thin-film diamond 71 comprising a plurality of memory regions is rotated. Thus, the writing light and the read-out light are irradiated to the corresponding memory region (for example, a region about 2 μm×2 μm in area) for an extremely short period of time. That is, the lights are each irradiated to the corresponding memory region in the form of a so-called pulsed light.

To make the constitution simple, the dose of the read-out light is maintained constant throughout the present example.

Furthermore, by setting the dose of the read-out light to a proper value, reading out can be effected repeatedly for a plurality of times.

The constitution according to the present example can be operated, for example, in a manner described below.

[Preparation before Operation]

The quantity of read-out transmitted light 78 corresponding to the dose of writing light 79 is measured, and the measured data is memorized by a semiconductor memory.

The dose of the writing light 79 is controlled as such that it may correspond to the predetermined information. For instance, information A is assigned to null irradiation of the writing light 79 (null dose), information B is assigned to a dose of 10 μWs/cm², and information C is assigned to a dose of 20 μWs/cm².

[Writing Operation]

The writing light 79 is irradiated to the predetermined memory region at a dose corresponding to the predetermined information above.

[Reading out Operation]

The read-out light 77 is irradiated to the predetermined memory region to measure the quantity of transmitted read-out light 78. The thus observed quantity of transmitted light is collated with the information memorized by the semiconductor memory above to judge which of the pieces of information A, B, and C, is written in the memory region.

By effecting the operation above while scanning the means 73 for use in irradiating the writing light, the means 74 for use in irradiating the read-out light, and the unit 75 for use in measuring the transmitted light in a direction indicated with arrows 76, and rotating simultaneously the disk, i.e., the thin-film diamond 71, the writing operation and reading out operation can be effected continuously on a plurality of memory regions.

As a matter of course, the information processable by the present constitution may include whether a writing light is irradiated or not, or a digital information of "1" or "0" according to the difference in dose. It is also possible to treat a plural pieces of information in a single memory region by precisely reading out the quantity of the transmitted read-out light 78. For example, by reading out the quantity of the transmitted read-out light in 256 grades, an 8-bit information can be treated in a single memory region. Since the difference in wavelength of a writing light is assumed to influence the quantity of the transmitted read-out light, the difference in wavelength of a writing light can be read out.

Furthermore, the difference in dose and the difference in wavelength can be combined to provide other types of writing light, in correspondence with a plurality of predetermined pieces of information.

In the constitution of the present example, the time duration for writing information in the corresponding memory region must be set constant by setting the irradiation time of writing light at a constant value, while varying the radiant intensity thereof. In this manner, a constitution in which the dose is varied can be realized. It is also effective to establish a constitution comprising a light source which is capable of irradiating the writing light at a variable radiation intensity. However, it is further effective to use a plurality of light sources, thereby obtaining a desired radiant intensity by converging light emitted from a predetermined number of light sources.

In the constitution according to the present example, a continuous analog information can be treated as well as the digital information. That is, a continuously varied dose of light corresponding to the information is irradiated to a rotating disk by employing a method of continuously changing the dose of the writing light. By principle, it is possible to realize a constitution similar to an analog record (although there is a fundamental difference concerning that the information is read in a non-contact manner in the present constitution).

By employing the constitution of the present example, a large-capacity disk memory capable of optically writing and reading out information in a non-contact manner can be implemented. Thus, in the constitution described in the present example, a predetermined piece of information is optically written and stored in a predetermined memory region, and the information can be rapidly read out by measuring the quantity of the transmitted read-out light.

In the present example, the conductivity type of the thin-film diamond 71 is not particularly limited. If necessary, it is possible to use a thin-film diamond of one conductivity type. This applies to cases in which materials other than diamond is employed.

Otherwise, in another constitution, the material in which a plurality of memory regions are formed (a thin-film diamond in the present example) may be fixed, while the writing light and the read-out light are irradiated by scanning.

The description above was made with reference to a case in which the quantity of the transmitted light 78 is measured using a measuring unit 75. However, the intensity of the transmitted light 78 may be measured by using the measuring unit 75.

EXAMPLE 2

Figure 8:
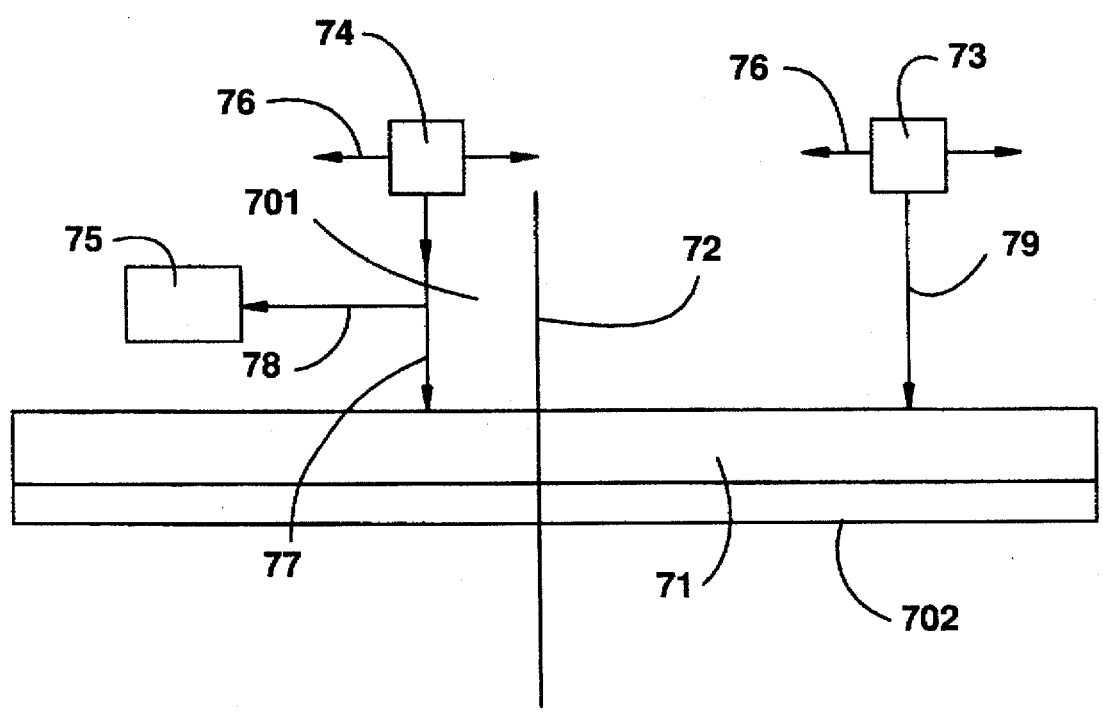
FIG. 8 shows schematically another disk memory device according to an embodiment of the present invention.

The present example refers to an improved constitution for that described in Example 1. Referring to the schematically drawn cross section view given in FIG. 8, the components indicated with the same numerals as those given in FIG. 7 are similar to those described in Example 1. The constitution with reference to FIG. 8 differs from that illustrated in FIG. 7 in that a metallic reflector layer 702 is newly provided.

In the constitution of the present example, a read-out light 77 emitted from a means 74 for use in irradiating the read-out light 77 is irradiated to a predetermined memory region of a thin-film diamond 71. The read-out light transmitted through the thin-film diamond is reflected by a reflector layer 702 and then by a half mirror 701, and reaches a measuring unit 75 for use in measuring the transmitted light 78. Thus, the quantity of the transmitted light 78 is measured in the measuring unit 75.

The other structures and modes of operation are similar to those described in Example 1. That is, the light irradiated from the means 74 for use in irradiating the read-out light is transmitted through the thin-film diamond 71 to yield the transmitted light 78, and the quantity of the transmitted light is measured in the measuring unit 75. The dose of the writing light is calculated from the measured quantity of transmitted light, and the information corresponding to the thus obtained dose is read out. In the present example again, as a matter of course, a method of reading out a digital information of "1" or "0" can be employed by detecting from the quantity of the transmitted writing light, for example, whether a writing light is irradiated or not, the difference in dose, etc. It is also possible to use a method of reading out the difference in the wavelength of the writing light.

EXAMPLE 3

The present example relates to a constitution based on those described in Example 1 or Example 2 above, which prevents the deterioration from occurring on the output, i.e., the quantity of transmitted read-out light, with increasing repetition times of reading out information. The deterioration of output is due to the loss of written information which occurs on reading out the information.

In the case where a photocurrent induced by the irradiating of a read-out light is used as a means for reading out information, the carriers trapped in the trap levels become excited and released every time reading out is effected. Thus, if reading out is performed continuously (by using a continuous light), or if reading out is performed repeatedly for a plurality of times, the photocurrent obtained as the output diminishes. Accordingly, on measuring the quantity of the read-out light transmitted through the material, it can be readily understood that the quantity of transmitted read-out light changes if a continuous observation of the transmitted light or a repeated measurement of the transmitted light by using a pulsed light for reading out is performed.

The change in the quantity of the transmitted light is believed attributable to the decrease in the number of carriers trapped in the trap levels. More specifically, the number of carriers trapped in the trap levels decreases because the irradiation of a read-out light excites and releases the trapped carriers from their trap levels. Thus, to maintain the written information obtained by irradiating a predetermined dose of writing light, the population of carriers corresponding to the initial dose of the writing light must be maintained in the trap levels.

To maintain the written information, accordingly, carriers must replenished at the same population as that released from the trap levels upon irradiating a read-out light.

Carriers can be trapped by the trap levels by irradiating a writing light. Thus, a writing light must be irradiated at a dose capable of trapping the carriers at the same number as the carriers that are excited and released from their trap levels upon irradiating a read-out light (a repeated irradiation of read-out light can be united into one). Conclusively, the written information can be apparently maintained every time it is read out from the material, by irradiating a writing light capable of newly trapping carriers in the trap levels at a population corresponding to that of the carriers excited and released from the trap levels on effecting a reading out operation.

The constitution according to the present example can be operated, for example, in a manner described below.

[Preparation before Operation]

(a) The relation between the quantity of read-out light 77 transmitted through the material to give a transmitted light 78 and the dose of writing light 79 is studied, and the information thus obtained is memorized by a semiconductor memory.

(b) The quantity of carriers lost at one time of reading out is measured. More specifically, the change in the transmitted light 78 which occurs at one time of reading out is measured, and the dose of the writing light 79 corresponding to the change in the transmitted light 78 is obtained. The information thus obtained is memorized by a semiconductor memory.

[Writing Operation]

(c) The writing light 79 is irradiated to the predetermined memory region at a dose corresponding to the predetermined information above.

[Reading out Operation]

(d) The read-out light 77 is irradiated to the predetermined memory region to measure the quantity of transmitted read-out light 78 using the measuring unit 75. The thus observed quantity of transmitted light is collated with the information memorized by the semiconductor memory above to calculate the dose of the writing light 79 irradiated previously to the material.

(e) The predetermined piece of information can be read out from the calculated dose of the writing light 79.

(f) After reading out the information, writing light 79 is irradiated to the corresponding memory region by using the means 73 for use in irradiating writing light, at a dose necessary for compensating the change in the quantity of transmitted light 78. In this manner, the same quantity of transmitted light 78 can be obtained in the succeeding reading out operation.

By carrying out the operation in the manner above, a constant quantity of transmitted light can be obtained for the read-out light 77 even in the case where reading out is effected repeatedly for a plurality of times- Accordingly, the dose of the writing light 79 can be obtained accurately from the quantity of the transmitted read-out light 77.

The operation described above is effective for a case in which, among the carriers trapped in the trap levels, a constant amount of carriers are lost by irradiating a read-out light once, provided that the read-out light is irradiated every time under the same conditions. However, there may be cases in which the number of lost carriers differs depending on the number of carriers trapped by the trap levels, because the number of the trapped carriers changes corresponding to the dose of writing light. That is, the loss of information which occurs on reading out the information may differ depending on the dose of the writing light.

The case above can be coped with by performing the operation (b) described above depending on the written information for a plurality of times corresponding to the number of types of information. For example, in the case where information A is read out, the information A can be maintained by irradiating writing light to the material thereafter at a dose of $A_1$. Similarly, information B can be maintained by irradiating writing light at a dose of $B_1$ after reading out the information, and information C can be maintained by irradiating writing light at a dose of $C_1$ after reading out the information.

An example for a simple operation is provided below as an explanatory means for the operation according to the present example.

Figure 9A:
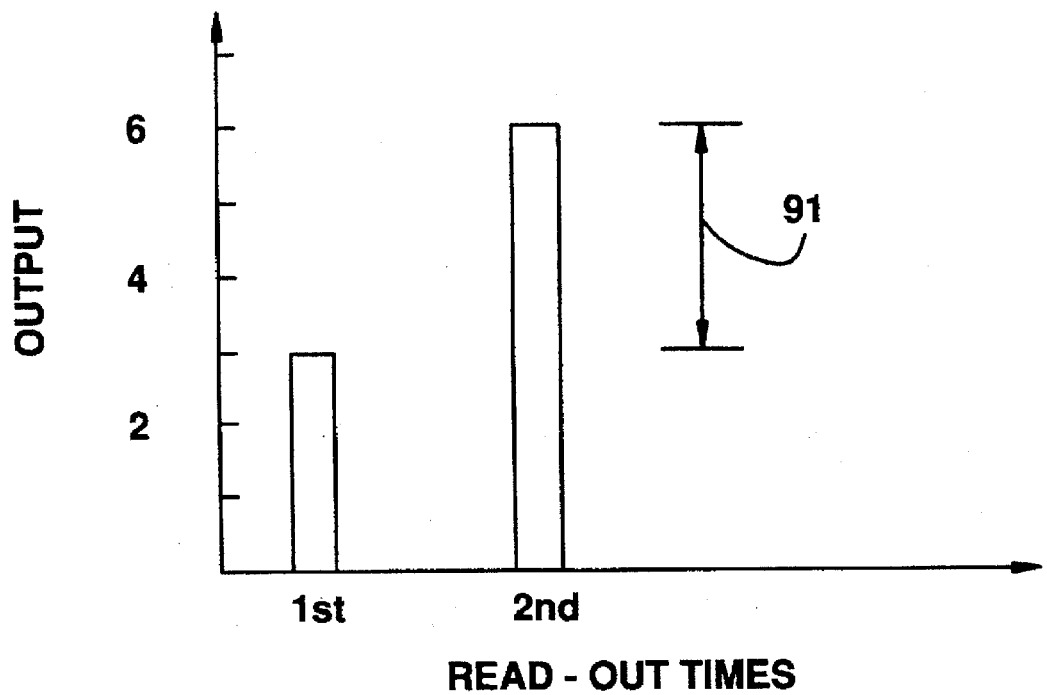
FIGS. 9A and 9B are a diagram showing an example of operation according to an embodiment of the present invention.

FIG. 9A shows an output (taken in the ordinate) obtained from the measuring unit 75 upon irradiating a first read-out light 77 (a pulsed light) to a single memory region, and that upon irradiating a second read-out light 77 (a pulsed light) to the same memory region. The output read on the ordinate corresponds to the output of a photodiode provided to the measuring portion 75. The output from the measuring portion 75 represents the relative quantity (or the intensity) of read-out light 78 transmitted through the thin-film diamond 71.

Figure 9B:
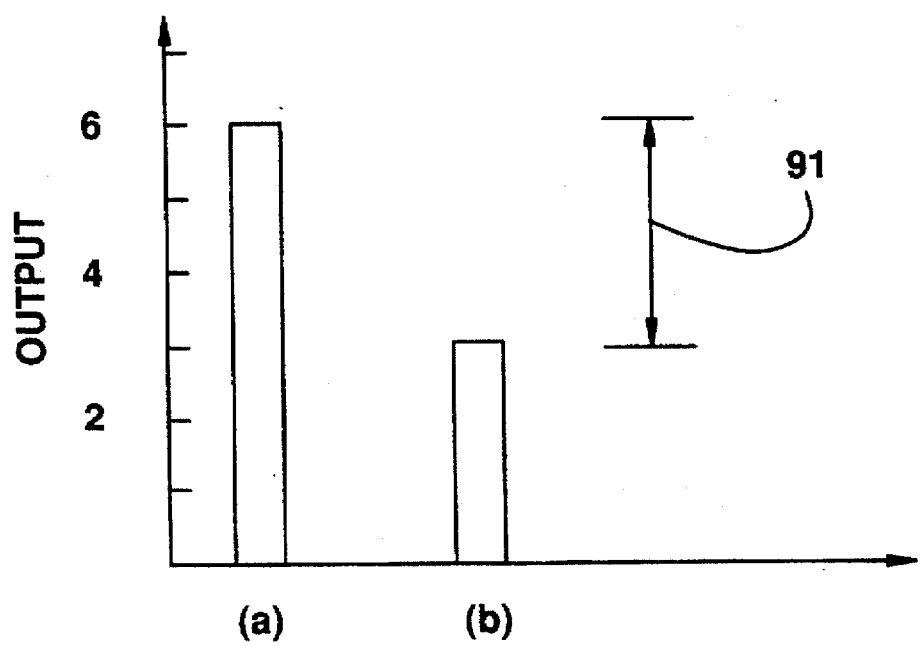

FIG. 9B shows outputs from the measuring unit 75 upon irradiating a read-out light (a pulsed light) under the same conditions to the memory regions (a) and (b) in which different pieces of information are written. That is, FIG. 9B shows the output on reading out the information from a memory region (a) furnished with information scaled 6, and that from a memory region (b) containing information scaled 3, both pieces of information being evaluated by the output upon reading out.

FIG. 9A shows that the quantity of the transmitted light 78 decreases in the case where read-out light is irradiated for the second time as compared with the case read-out light is irradiated for the first time. It is evident from this fact that the number of carriers that are excited from the trap levels decreases with increasing repetition of reading out the information, and that the photons in the read-out light lost in the thin-film diamond 71 decreases accordingly. Thus, the quantity of the read-out light transmitted by the thin-film diamond increases as a result. Accordingly, FIG. 9A shows that the output decreases for a relative scale of 3 (indicated with numeral 91) by reading out the information once. In other words, the quantity of transmitted read-out light 78 increases for a relative scale of 3.

The fact above can be considered in the following manner:

As shown in FIG. 9A, the quantity of transmitted light 78 increases for a relative scale of 3 indicated in the figure with numeral 91 by reading out the information once. That is, the information stored in the material decreases by reading out the information.

As shown in FIG. 9B, the difference in output for a relative scale of 3 can be eliminated by writing additionally a piece of information corresponding to a scale of 3 to the memory region (a) or by drawing out a piece of information corresponding to a scale of 3 from the memory region (b).

Thus, with respect to FIG. 9A, by irradiating a writing light 79 to the memory region between the first reading out and the second reading out at a dose corresponding to the difference in output indicated by 91, the same quantity of information obtained in the initial state can be recovered. Accordingly, the same output as that obtained in the first reading out can be obtained in the second reading out.

The operation above comprises compensating for the quantity of information (for example, information corresponding to the dose) drawn out from the memory region by a single reading out. Thus, on carrying out the second reading out, the information can be found to be present at the same quantity as in the first time of reading out.

In the present example, a writing light 79 was irradiated to the memory region to maintain the information written on the thin-film diamond 71. However, a means for irradiating a light corresponding to the writing light may be provided separately from the means 73 for use in irradiating a writing light. That is, a means for maintaining the written information can be provided independently from other means. In such a constitution, the conditions required to the light for maintaining the written information are the same as those required to a writing light.

EXAMPLE 4

The present example relates to an arithmetic unit based on the constitution described in the foregoing Example 1 or 2, in which light is used for input and output.

The present example is obtained by further extending the method of operation described in Example 3. In a device illustrated in FIG. 7 or FIG. 8, for instance, pieces of information are input by irradiating a writing light to a plurality of memory regions (e.g., a region 2 µm×2 µm in area) provided on the thin-film diamond 71. The information thus written in the memory regions are output by irradiating a read-out light. Thus is provided a constitution which inputs and outputs information in the memory regions.

Let us consider a constitution in which 10 units of information is written in a single memory region. In this case, 10 units of information are discriminated from each other by differing the dose of writing light. Thus, a predetermined units of information can be input into the memory region by irradiating the writing light, and a specified information can be drawn from the memory region by irradiating a read-out light.

In the discussion hereinafter, "reading out of the information" signifies an operation of simply reading out the information without causing any loss of the information. The term "drawing out of information" represents an operation of drawing out the information from a specified memory region, i.e., output of information, in such a manner that the information is completely erased from the memory region.

For instance, let us consider a case of inputting 5 units of information into a particular memory region (an arbitrary memory region), and drawing 3 units of information therefrom. The 5 units of information can be input into the memory region by irradiating a writing light to the memory region at a dose corresponding to 5 units of information. On drawing out 3 units of information (thus leaving 2 units of information stored in the memory region), the 5 units of information is read out by irradiating a reading out light to the memory region at a dose necessary for drawing out 3 units of information. Furthermore, by performing the operation shown in Example 3, 5 units of information can be simply read out without drawing out the information (while leaving over 5 units of information in the memory region).

On drawing out the information from the memory region by irradiating a reading out light, measurements must be conducted previously to evaluate the quantity of information which can be drawn from the memory region upon irradiating a read-out light. Then, the dose, the intensity, or the wavelength of the read-out light, as well as the combination thereof, can be determined based on the observed data.

The constitution according to the present example with reference to FIG. 7, for instance, implements a type of an optical arithmetic unit comprising the writing light 79 as the input and the read-out light 77 transmitted through the material to yield a transmitted light 78 as the output.

On writing the information to a particular memory region, the dose of writing light or the wavelength thereof, as well as the combination thereof can be utilized. A piece of written information can be erased by irradiating, to the corresponding memory region, a white light or a light having a broad wavelength region in a region corresponding to an energy lower than the energy band gap of the material (in case of using silicon carbide as the material, for example, a light having a broad wavelength ranging from a visible wavelength region to an infrared wavelength region), or by irradiating a read-out light at a dose large enough to completely read out the written information.

EXAMPLE 5

Figure 10:
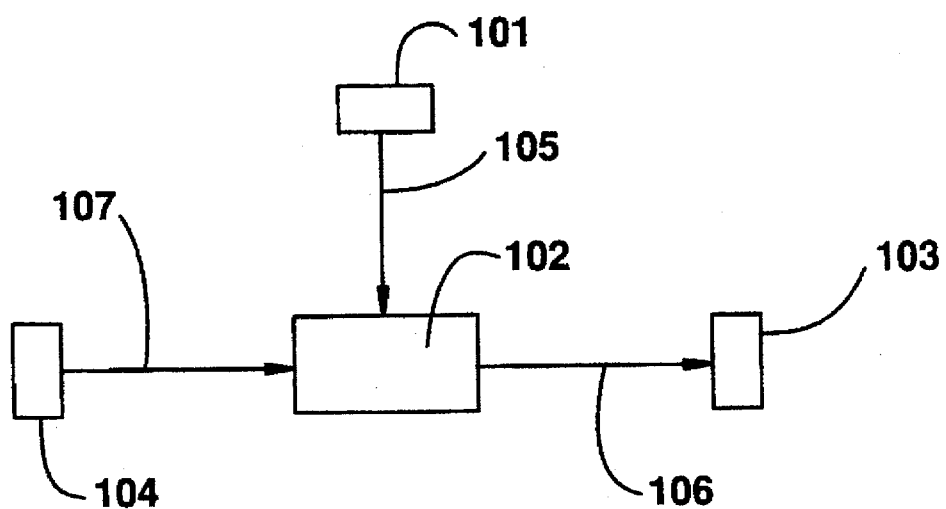
FIG. 10 shows schematically an optical element according to an embodiment of the present invention.

FIG. 10 shows a scheme of a constitution according to the present example. Referring to FIG. 10, the present example provides an optical element using a first light 105 as the input and a light 106 obtained by transmitting a second light 107 through the material as the output, and comprising a material 102. As a matter of course, the following relation must be fulfilled:

$$E_2 < E_g < E_1$$

where Eg represents the energy band gap of the material, $E_1$ represents the energy corresponding to the wavelength of the first light, and $E_2$ represents the energy corresponding to the wavelength of the second light.

The constitution according to the present example exhibits a function of controlling the quantity or the intensity of transmitted second light 106 by using the first light 105. In other words, the constitution of the present example functions as an optical element which controls the second light by using the first light.

A constitution using diamond for the material 102 of the element is described below. Referring to FIG. 10, a means 101 irradiates the first light, and also is a means to irradiate a light having a wavelength (a wavelength shorter than about 230 nm) corresponding to an energy (photon energy) higher than the energy band gap of diamond. A means 104 is provided to irradiate the second light, and is a means to irradiate a light having a wavelength (a wavelength longer than about 230 nm) corresponding to an energy (photon energy) lower than the energy band gap of diamond. A means 103 detects the quantity, the intensity, or the difference in spectrum of the light 106 transmitted through diamond 102, and comprises a known photodetector means (for example, a photodiode).

The present example can be operated in any of the manner described in the foregoing Examples 1 to 4. That is, the constitution of the present example can be operated as a memory element as well as an arithmetic unit.

The material 102 for use in the present constitution is not only restricted to diamond, and basically, any material having a photoconductive effect, a trap level for trapping an excited carrier, and an energy band gap, can be used as well.

In case of using a material other than diamond, the first and the second lights 105 and 107, the means 101 and 104 for irradiating the first and the second lights, respectively, the means 103 for measuring the quantity or the intensity of the transmitted light 106 obtained from the second light, etc., can be determined by taking the energy band gap of the material into consideration.

An example of another constitution for the optical element above can be specified by using single crystal silicon (having an Eg of 1.1 eV, corresponding to a wavelength of about 1,130 nm) as the material 102 constituting the element, a laser radiation 780 nm in wavelength as the first light 105, a laser radiation 1,500 nm in wavelength as the second light 107, a GaAlAs based semiconductor laser which is operated at a wavelength of 780 nm as the means 101 for irradiating the first light, an InP based semiconductor laser operated at a wavelength of 1,500 nm as the means 104 for irradiating the second light, and a photodiode using Ge and having a high sensitivity in the vicinity of a wavelength of 1,500 nm as the means 103 for measuring the transmitted light 106.

EXAMPLE 6

Figure 11:
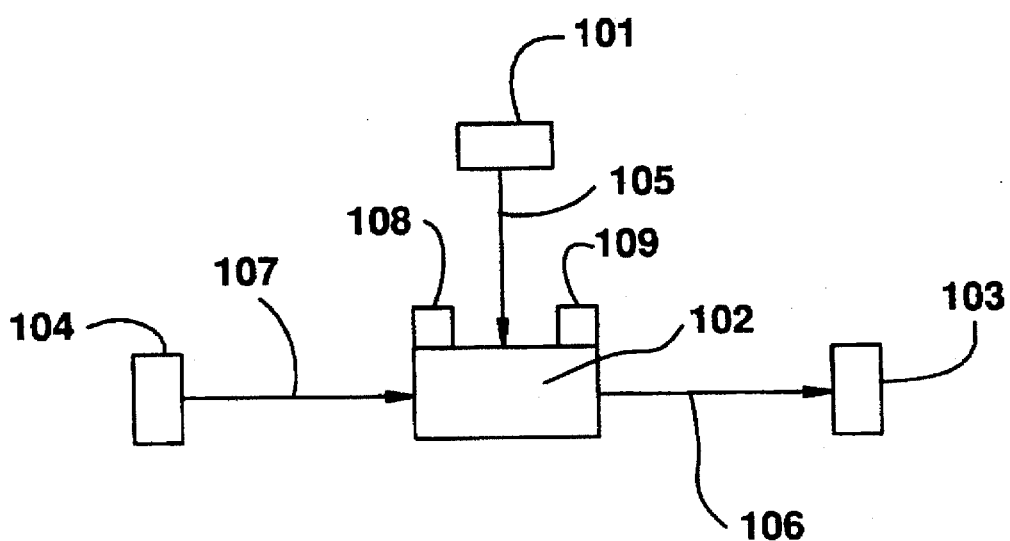
FIG. 11 shows schematically another optical element according to an embodiment of the present invention.

FIG. 11 shows a scheme of a constitution according to the present example. Referring to FIG. 11, the components indicated with the same numerals as those given in FIG. 10 are similar to those described in Example 5. The device with reference to FIG. 11 comprises a pair of electrodes 108 and 109. Although not shown in the figure, the device may further comprise, if necessary, a power supply for applying a bias between the pair of electrodes 108 and 109, an amplifier for use in the amplification of the photocurrent which flows between the electrodes 108 and 109, a means for measuring the photocurrent, a means for processing data obtained from the means enumerated above, or a means for storing the data.

By irradiating the second light 107 to the constitution above while applying a voltage between the pair of electrodes, a photocurrent flows between the pair of electrodes 108 and 109 at a quantity in proportion to the dose of first light 105. Thus, the information written by the first light can be read out by detecting the photocurrent generated between the pair of electrodes.

Because the device with reference to FIG. 11 includes the function of the device illustrated in FIG. 10, it yields two types of output: one is an output obtained from the quantity or the intensity of light 106, and the other is an output obtained as a photocurrent flown between the pair of electrodes 108 and 109. These two types of output thus obtained can be each related to the information obtained from the quantity and the wavelength of the first light 105, and the information obtained by combining the quantity and the wavelength of the light.

The constitution of the present example provides an element having a memory function and which provides two outputs from a single input. The same operation as that described in Examples 3 and 4 can be conducted by using the photocurrent as the output. More specifically, the drop in photocurrent which occurs on reading out the information after irradiating once a second light (read-out light) 107 is investigated previously, and the first light is irradiated at a predetermined dose according to the thus obtained data every time the second light 107 is irradiated to the material. The constitution implemented in this manner yields the same photocurrent every time the second light 107 is irradiated.

EXAMPLE 7

The present example provides a constitution similar to those described in the foregoing Examples 1, 2, or 6, except for using a thin film of silicon carbide (SiC) in the place of thin-film diamond 71 or the material 102 constituting the element.

The energy band gap of a silicon carbide fabricated by a vapor phase process falls in a range of from 2 to 3 eV. If an energy band gap of 3 eV is hypothesized for silicon carbide, a light exhibiting an intense spectrum in the ultraviolet wavelength region (400 nm or less in wavelength), such as a light emitted from a mercury vapor lamp, can be used as a writing light, because an energy band gap of 3 eV corresponds to a wavelength of about 413 nm. Accordingly, a He—Ne gas laser emitting light at a wavelength of 633 nm, or various types of semiconductor lasers emitting light in the visible wavelength region or the infrared wavelength region can be used as a means for emitting a read-out light. The method of operation and the like are the same as those described in Example 1. As a matter of course, the operation described in Example 3 can be applied to the constitution of the present example.

In case of using a material other than that described in the present example, as described in the foregoing, the wavelength of the writing light and the read-out light must be determined by taking the energy band gap of the material into consideration.

EXAMPLE 8

The present example provides a constitution similar to those described in the foregoing Examples 1, 2, or 6, except for using a single crystal silicon in the place of a disk portion made of thin-film diamond 71 or a material 102 constituting the element. A single crystal silicon has an energy band gap of about 1.1 eV, which corresponds to a wavelength of about 1,130 nm. Accordingly, GaAs based semiconductor lasers emitting light in a visible wavelength region (well known lasers of this type are used in compact disk players) and operated at a wavelength of not longer than 1,130 nm can be used as a means for irradiating writing light, and InP based semiconductor lasers emitting light at a wavelength of not shorter than 1,130 nm and falling in a wavelength range of from 1,200 to 1,600 nm (which are known as lasers for use in telecommunication using optical fibers) can be used as a means for irradiating read-out light.

A single crystal silicon has a narrow band gap of about 1.1 eV. Thus, the quantity of information (the population of carriers that are trapped by the trap level) which can be written in a single crystal silicon is assumed to be relatively small as compared with that in case of using diamond. Thus, a sure operation can be expected for a case of measuring the quantity of the transmitted read-out light to detect whether a writing light is irradiated or not to the material. Because this method of operation can treat only the digital information of "0" or "1", the quantity of information which can be treated becomes limited. As a matter of course, the quantity of transmitted read-out light can be finely discriminated in accordance with the dose of the writing light to treat two types or more pieces of information in a single memory region.

When a material (e.g., diamond) having distinguished physical properties is illuminated by a first light having a wavelength shorter than a particular value corresponding to the energy band gap of the material, and then by a second light having a wavelength longer than the particular value, the information related to the first light can be obtained by measuring the quantity of second light transmitted through the material. Then, by utilizing the above phenomena, a disk memory device or an arithmetic unit of a completely novel type can be implemented.

An element utilizing the constitution of the present invention exhibits a function of storing an input signal in addition to a simple memory function. Thus, an arithmetic unit having a learning function can be realized. Such functions are applicable to neural network structures and chaotic arithmetic units, and can be widely extended to be utilized in analog computers of the non-Neumann type.

While the invention has been described in detail and with reference to specific embodiments thereof, it will be apparent to one skilled in the art that various changes and modifications can be made therein without departing from the spirit and scope thereof.

What is claimed is:

1. An electronic device comprising:
    a material having a photoconductive effect, a trap level for tapping an excited carrier, and an energy band gap;
    means for illuminating a material with a first light, the first light having a wavelength corresponding to an energy higher than the energy band gap of the material;
    means for illuminating the material with a second light, the second light having a wavelength corresponding to an energy lower than the energy band gap of the material;
    means for measuring the quantity of the second light transmitted through the material; and
    means for obtaining information on the first light from the quantity of the transmitted second light.

2. The device of claim 1, wherein the information on the first light refers to whether the material is illuminated with the first light or not.

3. The device of claim 1, wherein the information on the first light refers to a dose of the first light with which the material is illuminated.

4. The device of claim 1, wherein the information on the first light is a change in the wavelength of the first light with which the material is illuminated.

5. The device of claim 1, wherein the first light and the second light are irradiated simultaneously.

6. The device of claim 1, wherein the second light is irradiated after the first light is irradiated.

7. The device of claim 1, wherein the means for measuring the quantity of the transmitted second light is provided with means for measuring the spectrum of the light transmitted through the material upon illuminating the material with the second light.

8. The device of claim 1, wherein the electronic device utilizes the first light as an input and outputs the transmitted second light.

9. The device of claim 1, wherein the relation below is satisfied:

$$E_2 < Eg < E_1$$

where Eg represents the energy band gap of the material, $E_1$ represents the energy corresponding to the wavelength of the first light, and $E_2$ represents the energy corresponding to the wavelength of the second light.

10. The device of claim 1, wherein a lower limit in the wavelength of the first light is determined by the lower limit of the region of wavelength in which the material has photo sensitivity, and
    an upper limit in the wavelength of the second light is determined by the upper limit of the region of wavelength in which the material has photo sensitivity.

11. The device of claim 1, wherein the intensity of the transmitted light is determined by measuring a quantity of light transmitted per unit of time.

12. The device of claim 1, wherein a dose of light is defined as a value obtained by a time integration of a radiant intensity.

13. The device of claim 1, wherein a lower limit in the wavelength of the first light is in the wavelength region for an X-ray or a gamma ray radiation.

14. The device of claim 1, wherein an upper limit in the wavelength of the second light is in the wavelength region for an infrared radiation.

15. The device of claim 1, wherein an upper limit in the wavelength of the second light is in the wavelength region for a visible light.

16. The device of claim 1, wherein a lower limit in the wavelength of the first light is in the wavelength region for an ultraviolet radiation.

17. The device of claim 1, wherein said material comprises diamond.

18. A method for operating an electronic device which uses a material having a photoconductive effect, a trap level for trapping an excited carrier, and an energy band gap, said method comprising:

illuminating the material with a first light, the first light having a wavelength corresponding to an energy higher than the energy band gap of the material;

illuminating the material with a second light, the second light having a wavelength corresponding to an energy lower than the energy band gap of the material; and obtaining information on the first light by measuring the quantity of second light transmitted through the material.

19. The method of claim 18, wherein the information on the first light refers to whether the material is illuminated with the first light or not.

20. The method of claim 18, wherein the information on the first light refers to a dose of the first light with which the material is illuminated.

21. The method of claim 18, wherein the information on the first light is a change in the wavelength of the first light with which the material is illuminated.

22. The method of claim 18, wherein the second light is irradiated simultaneously with the first light.

23. The method of claim 18, wherein the second light is irradiated after the first light is irradiated.

24. The method of claim 18, wherein the quantity of the transmitted second light is measured by the spectrum of a light transmitted through the material upon illuminating the material with the second light.

25. The method of claim 18, wherein the electronic device utilizes the first light as an input and outputs the transmitted second light.

26. The method of claim 18, wherein the relation below is satisfied:

$$E_2 < E_g < E_1$$

where Eg represents the energy band gap of the material, $E_1$ represents the energy corresponding to the wavelength of the first light, and $E_2$ represents the energy corresponding to the wavelength of the second light.

27. The method of claim 18, wherein, after irradiating the second light, the first light is irradiated in correspondence with the quantity of the transmitted light which changes upon irradiating the second light, thereby controlling the quantity of the transmitted light as such that a constant value therefor is obtained over a plurality of times of irradiating the second light.

28. The method of claim 18, wherein, a lower limit in the wavelength of the first light is determined by the lower limit of the region of wavelength in which the material has photo sensitivity, and an upper limit in the wavelength of the second light is determined by the upper limit of the region of wavelength in which the material has photo sensitivity.

29. The method of claim 18, wherein an intensity of the transmitted light is determined by measuring a quantity of the light transmitted per unit of time.

30. The method of claim 18, wherein the quantity of light is defined as a value obtained by the a integration of the radiant intensity.

31. The method of claim 18, wherein a lower limit in the wavelength of the first light is in the wavelength region for an X-ray or gamma ray radiation.

32. The method of claim 18, wherein a upper limit in the wavelength of the second light is in the wavelength region for an infrared radiation.

33. The method of claim 18, wherein a upper limit in the wavelength of the second light is in the wavelength region for a visible light.

34. The method of claim 18, wherein a lower limit in the wavelength of the first light is in the wavelength region for an ultraviolet radiation.

35. The method of claim 18, wherein a thin-film diamond is used as the material having:

a photoconductive effect;

a trap level for trapping an excited carrier; and an energy band gap.

36. An electronic device comprising:

a material having a trap level for trapping an excited carrier, the material being irradiated with a light; and means for detecting information corresponding to the carrier trapped in the trap level in accordance with a quantity of a light transmitted through the material.

37. An electronic device comprising:

a material having an energy band gap;

means for writing information into the material using a light having a wavelength corresponding to an energy higher than the energy band gap of the material; and means for detecting the information in accordance with a quantity of a transmitted light when a light having a wavelength corresponding to an energy lower than the energy band gap of the material is transmitted through the material.

38. An electronic device comprising:

a material having an energy band gap; and means for detecting information corresponding to an irradiation quantity of a light having wavelength corresponding to an energy higher than the energy band gap of the material in accordance with a quantity of a transmitted light when a light having a wavelength corresponding to an energy lower than the energy band gap of the material is transmitted through the material.

39. An electronic device comprising:

a material having an energy band gap; and means for detecting information corresponding to a total irradiation energy of a light having a wavelength corresponding to an energy higher than the energy band gap of the material in accordance with a quantity of a transmitted light when a light having a wavelength corresponding to an energy lower than the energy band gap of the material is transmitted through the material.

40. An electronic device comprising:

a material having an energy band gap; and means for detecting at least one of a first information of whether or not a writing light is irradiated to the material, a second information with respect to a change in a quantity of the writing light, and a third information with respect to a change in a wavelength of the writing light, in accordance with a quantity of a reading light transmitted through the material, wherein the writing light has a wavelength corresponding to an energy higher than the energy band gap of the material and the reading light has a wavelength corresponding to an energy lower than the energy band gap of the material.

\* \* \* \* \*